(12) United States Patent
Pan et al.

(10) Patent No.: US 11,249,046 B2
(45) Date of Patent: Feb. 15, 2022

(54) METHODS AND SYSTEMS FOR ANALYSIS

(71) Applicant: The Board of Trustees of The University of Alabama, Tuscaloosa, AL (US)

(72) Inventors: Shanlin Pan, Tuscaloosa, AL (US); Caleb M. Hill, Northport, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 190 days.

(21) Appl. No.: 16/676,603

(22) Filed: Nov. 7, 2019

(65) Prior Publication Data

US 2020/0088679 A1    Mar. 19, 2020

Related U.S. Application Data

(62) Division of application No. 14/598,312, filed on Jan. 16, 2015, now abandoned.

(60) Provisional application No. 61/928,455, filed on Jan. 17, 2014.

(51) Int. Cl.
*G01N 27/42*     (2006.01)
*G01N 27/30*     (2006.01)
*G01N 21/03*     (2006.01)
*G01N 21/64*     (2006.01)

(52) U.S. Cl.
CPC .......... *G01N 27/42* (2013.01); *G01N 27/305* (2013.01); *G01N 21/03* (2013.01); *G01N 2021/6482* (2013.01)

(58) Field of Classification Search
CPC ....... G01N 27/305416; G01N 27/4161; G01N 27/42; G01N 27/43; G01N 33/1813; G01N 2021/6482; G01N 2021/651; G01N 21/03; G01N 2021/513; G01N 21/76
See application file for complete search history.

(56) References Cited

U.S. PATENT DOCUMENTS 6,284,125 B1    9/2001 Hodges et al.

OTHER PUBLICATIONS

Abdelsalam et al., Electrochemical SERS at structured gold surface, Electrochemistry Communications, 7:740-744, 2005.
Albrecht et al., Anomalously Intense Raman Spectra of Pyridine at a Silver Electrode, J. Am. Chem. Soc., 99:5215-5217, 1977.
Arrigan, Nanelectrodes, nanoelectrode arrays and their applications, Analyst,129:1157-1165, 2004.
"Basics of Inverted Microscope", Olympus, last modified Oct. 23, 2012.
Bailo et al., Tip-Enhanced Raman Spectroscopy of Single RNA Strands: Towards a Novel Direct-Sequencing Method, Angewandte Chemie International Edition, 47:1658-1661, 2008.

(Continued)

*Primary Examiner* — Alexander S Noguerola
(74) *Attorney, Agent, or Firm* — Meunier Carlin & Curfman LLC

(57) ABSTRACT

Provided herein are systems and methods for the detection, quantification, and/or monitoring of analytes in samples. The systems and methods can be used, for example, to track the deposition and electrochemical behavior of individual nanoparticles and nanoparticles clusters clusters in situ with high spatial and temporal resolution. The systems and methods can be used to track the deposition and oxidation of several hundreds to thousands of nanoparticles simultaneously and reconstruct their voltammetric curves at the single nanoparticle level.

8 Claims, 14 Drawing Sheets

(56) References Cited

OTHER PUBLICATIONS

Benoist et al., Activation of aTiO2 Electrode Using Gold Particles for Efficient Electrogenerated Chemiluminescence from a Ruthenium Complex in Aqueous Solution, J. Phys. Chem. C, 114:1815-1821, 2010.
Biju et al., Intermittent Single-Molecule Interfacial Electron Transfer Dynamics, J. Am. Chem. Soc., 126:9374-9381, 2004.
Byers, , "Surface plasmon based spectroelectrochemical tuning and sensing with gold nanoparticle dimers", dissertation, Jul. 2013.
Caprette, , "Experimental Biosciences, Dark Field Viewing", published online May 11, 2000, updated Aug. 10, 2012.
Clayton et al., Photoluminescence and Spectroelectrochemistry of Single Ag Nanowires, ACS Nano, 4:2363-2373, 2010.
Clayton et al., Spatial and temporal variation of surface-enhanced Raman scattering at Ag nanowires in aqueous solution, Phys. Chem. Chem. Phys., 15:850-859, 2013.
Cortes et al., Monitoring the Electrochemistry of Single Molecules by Surface-Enhanced Raman Spectroscopy, J. Am. Chem. Soc., 132:18034-18037, 2010.
Davidson, , "Introduction to Microscopy Objectives", Accessed Mar. 14, 2017.
Dick et al., Metal Film over Nanosphere (MFON) Electrodes for Surface-Enhanced Raman Spectroscopy (SERS): Improvements in Surface Nanostructure Stability and Suppression of Irreversible Loss, J Phys Chem B, 106:853-860, 2002.
Etchegoin et al., Evidence of Natural Isotopic Distribution from Single-Molecule Sers, J. Am. Chem. Soc., 131:2713-2716, 2009.
Fan et al., Electrochemical Detection of Single Molecules, Science, 267:871-874, 1995.
Fan et al., A review on the fabrication of substrates for surface enhanced Raman spectroscopy and their applications in analytical chemistry, Anal. Chim. Acta, 693:7-25, 2011.
Fang et al., A SERS study of thiocyanate adsorption on Au-core Pd-shell nanoparticle film electrodes, Electroanal. Chem., 665:70-75, 2012.
Fleischmann et al., Raman Spectra of Pyridine Adsorbed at a Silver Electrode, Chemical Phyics Letters, 26:163-166, 1974.
Fuente, et al., "Bidimensional Spectroelectrochemistry", Anal. Chem. 2001,73, 2883-2889.
Garrell et al., Surface-Enhanced Raman Spectroscopy, Anal. Chem., 61:401A-411A, 1989.
Geng et al., Electrogenerated chemiluminescence and interfacial charge transfer dynamics of poly(3-hexylthiophene-2,5-diyl) (P3HT)-TiO2 nanoparticle thin film, Phys. Chem. Chem. Phys., 15:3504-3509, 2013.
Geng et al., Electrogenerated Chemiluminescence and Fluorescence Lifetime Spatial Heterogeneity of Poly (2-methoxy-5-(2-ethylhexyloxy)-1,4-phenylenevinylene) in Presence of [6,6]-phenyl-C61-butyric Acid Methyl Ester, MRS Proceedings, 1493, 2013.
Geng et al., Photoelectrochemical properties and interfacial charge transfer kinetics of BODIPY-sensitized TiO2 electrodes, RSC Adv., 3:2306-2312, 2013.
Graff et al., Adsorption of Enantiomeric and Racemic Cysteine on a Silver Electrode—SERS Sensitivity to Chirality of Adsorbed Molecules, J Phys Chem B, 109:9567-9574, 2005.
Guerrini et al., New insights on the Au core/Pt shell nanoparticle structure in the sub-monolayer range: SErS as a surface analyzing tool, Chem. Commun., 47:3174-3176, 2011.
Hasan et al., Selective Functionalization and Spectral Identification of Gold Nanopyramids, J. Phys. Chem. C, 111:17176-17179, 2007.
Hill et al., Fluorescence and Electroluminescence Quenching Evidence of Interfacial Charge Transfer in Poly (3-hexylthiophene) Graphene Oxide Bulk Heterojunction Photovoltaic Devices, ACS Nano, 5:942-951, 2011.
Hill et al., Efficient Analysis of Single Molecule Spectroscopic Data via MATLAB, Mater. Res. Soc., 1493, 2012.
Hill et al., A Dark Field Scattering Spectroelectrochemical Technique for Tracking the Electrodeposition of Single Ag Nanopariticels, Journal of the American Chemical Society, 135(46):17250-17253, 2013.
Hill et al., Combined optical and electrochemical methods for studying electrochemistry at the single molecule and single particle level: recent progress and perspectives, Phys., Chem., Chem., Phys, 00:1-11; 2013.
Hill et al. Spectroelectrochemical studies of single Ag nanostructures via fluorescence spectroscopy and darkfield scattering. 245 Am Chm Soc Nat'l meeting Apr. 7-11 New Orleans, LA, presentation.
Hill et al. Single Molecule and Nanoparticle Spectroelectrochemistry for Understanding Interfacial Chrge Transfer Events. 35 DOE Solar Photochemistry Research Conference Jun. 2-5, 2013.
Honesty et al., Shell-isolated nanoparticle enhanced Raman spectroscopy (SHINERS) investigation of benzotriazole film formation on Cu(100), Cu(111), and Cu(poly), J. Raman Spectrosc., 43:46-50, 2012.
Hu et al., Correlated Rayleigh Scattering Spectroscopy and Scanning Electron Microscopy Studies of Au—Ag Bimetallic Nanoboxes and Nanocages, J. Phys.Chem. C, 111:12558-12565, 2007.
Jeanmaire et al., Surface Raman Spectroelectrochemistry Part I. Hererocyclic, Aromatic, and Aliphatic Amines Absorbed on the Anodized Silver Electrode, Journal of Electroanalytical Chemistry and Interfacial Electrochemistry, 84:1-20, 1977.
Kneipp et al., Single Molecule Detection Using Surface-Enhanced Raman Scattering (SERC), Phys. Rev. Lett., 78:1667-1670, 1997.
Knight et al., Substrates Matter: Influence of an Adjacent Dielectric on an Individual Plasmonic Nanoparticle, Nano Lett., 9:2188-2192, 2009.
Larsson et al., Nanoplasmonic Probes of Catalytic Reaction, Science, 326:1091-1094, 2009.
Li et al., Shell-isolated nanoparticle-enhanced Raman spectroscopy, Nature, 464:392-395, 2010.
Li et al., Extraordinary Enhancement of Raman Scattering from Pyridine on Single Crystal Au and Pt Electrodes by Shell-Isolated Au Nanoparticles, J. Am. Chem. Soc., 133:15922-15925, 2011.
Li et al., Shell-Isolated Nanoparticle-Enhanced Rama Spectroscopy (SHINERS) Based on Gold-Core Silica-Shell Nanorods, Zeitschrift für Physikalische Chemie, 225:775-784, 2011.
Li et al., Probing the electrode-polymer interface in conjugated polymer devices with surface-enhanced Raman Scattering, Appl. Phys. Lett., 100:141907-4, 2012.
Li et al., Application of surface enhanced Raman spectroscopy to the study of SOFC electrode surfaces, Phys. Chem. Chem. Phys., 14:5919-5923, 2012.
Liu et al., Redox-Switching in a Viologen-type Adlayer: An Electrochemical Shell-Isolated Nanoparticle Enhanced Raman Spectroscopy Study on Au(111)-(1x1) Single Crystal Electrodes, ACS Nano, 5:5662-5672, 2011.
Lin et al., Electrochemical SERS at Periodic Metallic Nanopyramid Arrays, J. Phys. Chem. C, 113:1367-1372, 2009.
Lin et al., Synthesis of ultrathin and compact Au@MnO2 nanoparticels for shell-isolated nanoparticle-enhanced Raman spectroscopy (SHINERS), J. Raman Spectrosc., 43:40-45, 2012.
McMahon et al., Correlating the Structure, Optical Spectra, and Electrodynamics of Single Silver Nanocubes, J. Phys. Chem. C, 113:2731-2735, 2009.
Mock et al., Shape effects in plasmon resonance of individual colloidal silver nanoparticles, J. Chem. Phys., 116:6755-6759, 2002.
Mole et al., Highly Conductive Nanostructured C—TiO2 Electrodes with Enhanced Electrochemical Stability and Double Layer Charge Storage Capacitance, Langmuir, 28:10610-10619, 2012.
Morfa, et al., "Transparent metal electrodes from ordered nanosphere arrays", J. Appl. Phys. 2013, 114, 054502.
Mulvaney et al., Drastic Surface Plasmon Mode Shifts in Gold Nanorods Due to Electron Charging, Plasmonics, 1:61-66, 2006.
Munechika et al., Plasmon Line Widths of Single Silver Nanoprisms as a Function of Particle Size and Plasmon Peak Position, J. Phys. Chem.C, 111:18906-18911, 2007.
Nehl et al., Scattering Spectra of Single Gold Nanoshells, Nano Lett., 4:2355-2359, 2004.

(56) References Cited

OTHER PUBLICATIONS

Neugebauer et al., On the Way to Nanometer-Sized Information of the Bacterial Surface by Tip-Enhanced Raman Spectroscopy, ChemPhysChem, 7:1428-1430, 2006.

Nicolai et al., Electrochemical and spectroelectrochemical (SERS) studies of the reduction of methylene blue on a silver electrode, J Electroanal Chem, 527:103-111, 2002.

Nie et al., Probing single Molecules and Single Nanoparticles by Surface-Enhanced Raman Scattering, Science, 275:1102-1106, 1997.

Novo et al., Contributions from radiation damping and surface scattering to the linewidth of the longitudinal plasmon band of gold nanorods: a single particle study, Phys. Chem. Cherm.Phys., 8:3540-3546, 2006.

Novo et al., Influence of the Medium Refractive Index on the Optical Properties of Single Gold Triangular Prisms on a Substrate, J. Phys. Chem. C, 112, 3-7, 2008.

Novo et al., Direct observation of chemical reactions on single gold nanocrystals using surface plasmon spectroscopy, Nat Nano, 3:598-602, 2008.

Novo et al., Electrochemical Charging of Single Gold Nanorods, J. Am. Chem. Soc., 131:14664-14666, 2009.

Opilik et al., Nanoscale chemical imaging of segregated lipid domains using tip-enhanced Rama spectroscopy, Phys. Chem. Chem. Phys., 13:9978-9981, 2011.

Palacios et al., Charging and discharging of single conjugated-polymer nanoparticles, Nature Materials, 6:680-685, 2007.

Palacios et al., Detailed Single-Molecule Spectroelectrochemical Studies of the Oxidation of Conjugated Polymers, The Journal of Physical Chemistry B, 113:14619-14628, 2009.

Palys et al., SERS of 1,8-diaminonaphthalene on gold, silver and copper electrodes Polymerisation and complexes formed with the electrode material, J Electroanal Chem, 428:19-24, 1997.

Pettinger et al., Surface-enhanced and STM-tip-enhanced Rama Spectroscopy at Metal Surfaces, Single Molecules, 3:285-294, 2002.

Radisic, et al., "Quantifying Electrochemical Nucleation and Growth of Nanoscale Clusters Using Real-Time Kinetic Data", Nano Letters 2006, 6/2, 238-242.

Ren et al., Tip-Enhanced Raman Spectroscopy of Benzenethiol Adsorbed on Au and Pt Single-Crystal Surfaces, Ertl, Angewandte Chemie International Edition, 44:139-142, 2005.

Rodriguez-Fernandez et al., Spectroscopy, Imaging, and Modeling of Individual Gold Decahedra, J. Phys. Chem. C, 113:18623-18631, 2009.

Ru et al., Surface Enhanced Raman Scattering Enhancement Factors: A Comprehensive Study, J. Phys. Chem. C, 111:13794-13803, 2007.

Santos et al., Electrochemcial Control of the Time-Dependent Intensity Fluctuations in Surface-Enhanced Raman Scattering (SERS), J. Phys. Chem. C, 113:17737-17744, 2009.

Seo et al., Plasmonic Monitoring of Catalytic Hydrogen Generation by a Single Nanoparticel Probe, J. Am. Chem. Soc., 134:1221-1227, 2012.

Schmid et al., Performing tip-enhanced Raman spectroscopy in liquids, J. Raman Spectrosc., 40:1392-1399, 2009.

Sherry et al., Localized Surface Plasmon Resonance Spectroscopy of Single Silver Nanocubes, Nano Lett., 5:2034-2038, 2005.

Sherry et al., Localized Surface Plasmon Resonance Spectroscopy of Single Silver Triangular Nanoprisms, Nano Lett., 6:2060-2065, 2006.

SMEC Proposal Jul. 23, 2013.

Stadler et al., Developments in and practical guidelines for tip-enhanced Raman spectroscopy, Nanoscale, 4:1856-1870, 2012.

Stranahan et al., Super-resolution Optical Imaging of SingleMolecule SERS Hot Spots, Nano Lett., 10:3777-3784, 2010.

Sun et al., Electrochemistry of Individual Molecules in Zeptoliter vols. J. Am. Chem. Soc., 130:8241-8250, 2008.

Tang et al., Obervations of Shape-Dependent Hydrogen Uptake Trajectories from Single Nanocrystals, J. Am. Chem. Soc., 133:13220-13223, 2011.

Tian et al., Adsorption and Reaction at Electrochemical Interfaces as Probed by Surface-Enhanced Raman Spectroscopy, Annu. Rev. Phys. Chem., 55:197-229, 2004.

Tian et al., Expanding generality of surface-enhanced Raman spectroscopy with borrowing SERS activity strategy, Chem. Commun., 0:3514-95 3534, 2007.

Uzayisenga et al., Synthesis, Characterization, and 3D-FDTD Simulation of $Ag@SiO_2$ Nanoparticles for Shell- Isolated Nanoparticle-Enhanced Raman, Langmuir, 28:9140-9146, 2012.

Wang et al., Probing Single-Molecule Interfacial Electron Transfer Dynamics of Porphyrin on $TiO_2$ Nanoparticles, J. Am. Chem. Soc., 131:1479-1487, 2009.

Wang et al., In Situ Identification of Intermediates of Benzyl Chloride Reduction at a Silver Electrode by SERS Coupled with DFT Calculations, J. Am. Chem. Soc., 132:9534-9536, 2010.

Waters, , "Accuracy and precision in quantitative fluorescence microscopy", J. Cell Biol. 2009, 185/7, 1135-1148.

Weber et al., Super-Resolution Imaging Reveals a Difference between SERS and Luminescence Centroids, ACS Nano, 6:1839-1848, 2012.

Wu et al., Electrochemical surface-enhanced Raman spectroscopy of nanostructures, Chem. Soc. Rev., 37:1025-1041, 2008.

Xu et al., Single-Molecule Electrocatalysis by Single-Walled Carbon Nanotubes, Nano 5 letters, 9:3968-3973, 2009.

Xu et al., $Ti@TiO_2$ Nanowire Electrode with Polydisperse Gold Nanoparticles for Electrogenerated Chemiluminescence and Surface Enhanced Raman Spectroelectrochemistry, Phys. Chem.C, 117:1849-1856, 2013.

Yeo et al.. Tip-enhanced Raman Spectroscopy—Its status, challenges and future directions, Chemical Physics Letters, 472:1-13, 2009.

Zhang et al., Nanoscale Roughness on Metal Surfaces can Increase Tip-Enhanced Rama Scattering by an Order of Magnitude, Nano Lett., 7:1401-1405, 2007.

Zhang et al., Single Molecule Tip-Enhanced Raman Spectroscopy with Silver Tips, J. Phys. Chem. C, 111:1733-1738, 2007.

Zhu et al., Reductive-Oxidation Electrogenerated Chemiluminescence (ECL) Generation at a Transparent Silver Nanowire Electrode, Langmuir, 27:3121-3127, 2011.

(A)

(B)

(C)

(D)

METHODS AND SYSTEMS FOR ANALYSIS

CROSS-REFERENCE TO RELATED APPLICATION

This application is a division of U.S. application Ser. No. 14/598,312 filed Jan. 16, 2015, which claims the benefit of U.S. Provisional Application No. 61/928,455, filed Jan. 17, 2014, which are both hereby incorporated herein by reference in their entireties.

STATEMENT OF GOVERNMENT SUPPORT

This invention was made with government support under Grant No. DE-SC0005392 awarded by the Department of Energy. The government has certain rights in this invention.

BACKGROUND

Metallic nanostructures have been thoroughly studied over the past several decades due to their unrivaled ability to catalyze redox reactions that are relevant to alternative energy storage and conversion systems. Some metallic nanoparticles, such as silver and gold nanoparticles, also have interesting optical properties (e.g., surface plasmon resonance (SPR)) in the visible region of the electromagnetic spectrum. These properties have been most notably exploited to enhance detection for a litany of optical spectroscopies (Raman, scattering, fluorescence, sum frequency generation, etc.) and to improve the efficiency of photovoltaic devices. Given the importance of such structures, method for characterizing them, especially in situ methods, are valuable for studying structure-property relationships. Even better are methods capable of resolving individual structures, dispelling the broadening of peaks inherent in ensemble measurements. The methods and compositions disclosed herein address these and other needs.

SUMMARY

Disclosed herein are systems and method for the detection, quantification, and/or monitoring of analytes, including nanoparticles, in samples. The disclosed systems and methods can be used, for example, to track the deposition and electrochemical behavior of individual nanoparticles and nanoparticle clusters in situ with high spatial and temporal resolution. The disclosed systems and methods can even be used to track the deposition and oxidation of several hundreds to thousands of nanoparticles simultaneously and reconstruct their voltammetric curves at the single nanoparticle level, feats not possible through existing electrochemical techniques.

Also, disclosed herein are systems that comprise an electrochemical cell, a light source configured to illuminate the electrochemical cell, and an instrument configured to capture an optical signal from the electrochemical cell. The disclosed electrochemical cell can comprise a working electrode in electrochemical contact with a liquid sample comprising an analyte, one or more additional electrodes in electrochemical contact with the liquid sample, a sample containment vessel, and a power supply. The sample containment vessel can comprise a top end, a bottom end, an exterior surface, and an interior void defined by an interior surface. The sample containment vessel can be configured such that the bottom end forms a liquid tight seal with the working electrode, and the liquid sample is contained in the volume defined by the interior void of the sample containment vessel and the working electrode.

Optionally, the sample containment vessel can further comprise a channel that punctuates the interior surface and leads through the sample containment vessel to the exterior surface or top end of the sample containment vessel. The one or more additional electrodes can be inserted through the channel such that the one or more additional electrodes are in electrochemical contact with the liquid sample and the one or more additional electrodes form a liquid tight seal with the channel.

In some examples, the sample containment vessel further comprises a supporting member comprising a top end, a bottom end, an exterior surface, and an interior void defined by an interior surface. The supporting member can be configured such that the top end forms a liquid tight seal with the working electrode, such that the working electrode is sandwiched within the sample containment vessel.

In some examples, the system can further comprise a first lens. In some examples, the first lens can be configured such that the light source and instrument are below the first lens and the electrochemical cell is above the first lens. In some examples, the system can further comprise a second lens. In some examples, the system further comprising the first lens and the second lens can be aligned such that the first lens is above the instrument; the electrochemical cell is above the first lens; the second lens is above the electrochemical cell; and the light source is above the second lens.

In certain examples, the system can further comprise a computing device configured to receive an electrochemical signal from the power supply; receive an optical signal from the instrument; process the electrochemical signal to obtain an electrochemical parameter; process the optical signal to obtain an optical parameter; optionally correlate the electrochemical parameter to the optical parameter to obtain an optoelectrochemical parameter; and output the electrochemical parameter, the optical parameter, the optoelectrochemical parameter, or combinations thereof.

Methods for the detection, quantification, and/or monitoring of analytes, including nanoparticles, in liquid samples are also disclosed herein. The methods can involve the use of optical signal and/or electrochemical signal analysis to detect, quantify and/or monitor analytes, including nanoparticles, in a liquid sample. The methods can be performed using the systems described herein. Methods for the detection, quantification, and/or monitoring of analytes can comprise providing an electrochemical cell comprising a working electrode in electrochemical contact with a liquid sample comprising an analyte, a sample containment vessel, one or more additional electrodes in electrochemical contact with the liquid sample and a power supply electrically coupled to the working electrode and the one or more additional electrodes. The sample containment vessel can comprise a top end, a bottom end, an exterior surface and an interior void defined by an interior surface, wherein the bottom end forms a liquid tight seal with the working electrode and the liquid sample is contained in the volume defined by the interior void of the sample containment vessel and the working electrode. The disclosed methods can further comprise capturing an electrochemical signal from the power supply, capturing an optical signal from the electrochemical cell, processing the electrochemical signal to obtain an electrochemical parameter, processing the optical signal to obtain an optical parameter, and optionally correlating the optical parameter to the electrochemical parameter to obtain an optoelectrochemical parameter.

Also disclosed herein are sample containment vessels. The sample containment vessel can comprise a top end, a bottom end, an exterior surface and an interior void defined by an interior surface. In some examples, the sample containment vessel is configured to receive a working electrode such that the bottom end forms a liquid tight seal with the working electrode. In some examples, the volume defined by the interior void of the sample containment vessel and the working electrode is configured to contain a liquid sample, and the working electrode can be in electrochemical contact with the liquid sample. In some examples, the sample containment vessel further comprises a channel that punctuates the interior surface of the sample containment vessel and leads through the sample containment vessel to the top end or exterior surface of the sample containment vessel. In some examples, the channel is configured to receive one or more additional electrodes such that the one or more additional electrodes are in electrochemical contact with the liquid sample and the one or more additional electrodes form a liquid tight seal with the channel.

In some examples, the sample containment vessel can further comprise a channel that punctuates the interior surface and leads through the sample containment vessel to the exterior surface or the top end of the sample containment vessel. The one or more additional electrodes can be inserted through the channel such that the one or more additional electrodes are in electrochemical contact with the liquid sample and the one or more additional electrodes form a liquid tight seal with the channel In some examples, the sample containment vessel comprises multiple channels through which multiple electrodes or other probes can be inserted.

In some examples, the sample containment vessel further comprises a supporting member comprising a top end, a bottom end, an exterior surface, and an interior void defined by an interior surface. The supporting member can be configured such that the top end forms a liquid tight seal with the working electrode, such that the working electrode is sandwiched within the sample containment vessel.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1:
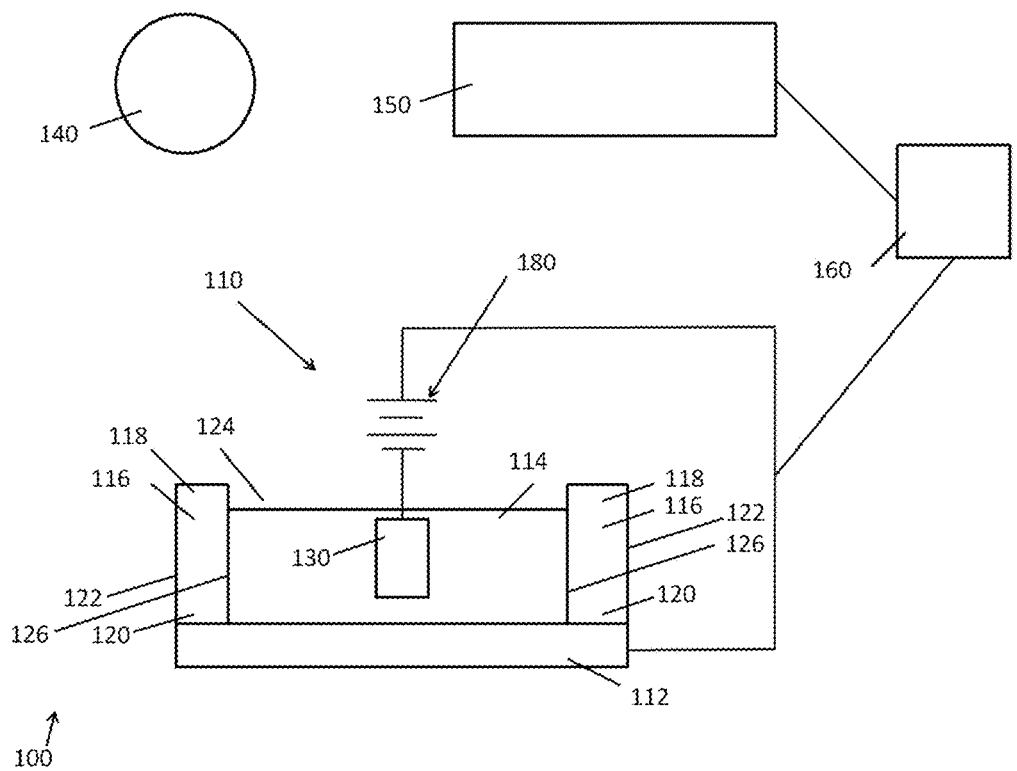
FIG. 1 is a schematic of an exemplary system as disclosed herein for the detection, quantification and/or monitoring of samples.

The systems, methods, articles, and devices described herein may be understood more readily by reference to the following detailed description of specific aspects of the disclosed subject matter, figures and the examples included therein.

Before the present systems, methods, articles, and devices are disclosed and described, it is to be understood that the aspects described below are not intended to be limited in scope by the specific systems, methods, articles, and devices described herein, which are intended as illustrations. Various modifications of the systems, methods, articles, and devices in addition to those shown and described herein are intended to fall within the scope of that described herein. Further, while only certain representative systems and method steps disclosed herein are specifically described, other combinations of the systems and method steps also are intended to fall within the scope of that described herein, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various examples, the terms "consisting essentially of" and "consisting of" can be used in place of "comprising" and "including" to provide for more specific examples of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

Reference will now be made in detail to specific aspects of the disclosed materials, compounds, compositions, articles, and methods, examples of which are illustrated in the accompanying examples and figures.

For any quantitative analytical technique, a single analyte or single chemical reaction event represents the ultimate attainable limit of detection. This may come in the form of an atom, a molecule, a nanoparticle (NP), a defect site on a crystal surface, or a single molecule undergoing a redox reaction at a bulk electrode. There are inherent advantages to measurements at this limit, a primary one being the ability to thoroughly characterize heterogeneities in structure or reactivity that would only manifest in ensemble measurements as the broadening of peaks. In the electrodeposition of NPs, for example, traditional electrochemical measurements can be used to calculate the total quantity of material deposited through Faraday's law. If the number and shape of particles are known, an average size can be obtained. However, information on the resulting size distribution cannot be directly obtained through such measurements.

Methods capable of resolving electrochemical reactions occurring at individual nanostructures are critical to accurately determining their structure-function relationships. The direct electrochemical detection of single NPs has been demonstrated via a current amplification scheme as they collide at a microelectrode. More recently, heterogeneities in the catalytic activity of single metal NPs and the charge transfer performance of individual conjugated polymer molecules/NPs have been studied using fluorescence-based single molecule spectroelectrochemical (SMSEC) methods. Tao et al. have developed a surface plasmon resonance (SPR)-based imaging technique capable of measuring local electrochemical currents down to the single nanoparticle level by exploiting the sensitivity of SPR to the local dielectric environment. However, disclosed herein is a method that uses dark field scattering (DFS) spectroelectrochemistry to analyze the electrochemical formation of individual nanoparticles (NPs) at the surface of an electrode. Heterogeneities in redox potentials among NPs not visible in the bulk electrochemical measurements are also disclosed. Through correlated electron microscopy, single nanoparticle light scattering intensity can be correlated to particle size according to Mie theory, permitting the rapid particle size determination and the construction of voltammetric curves of individual nanoparticles.

In the disclosed methods, the change in signal is dominated by the modification of the metal nanostructure geometry rather than changes in dielectric environment, which is the case in SPR. Neither the reported SPR imaging techniques nor the other aforementioned SMS-EC methods have been employed to directly observe the synthesis of individual NPs.

Provided herein are systems and method for the detection, quantification, and/or monitoring of analytes, including nanoparticles, in samples. The disclosed systems and methods utilize a spectroelectrochemical method employing dark field scattering microscopy and can be used, for example, to track the deposition of individual nanoparticles and nanoparticles clusters in situ with high spatial (~350 nm) and temporal (ms) resolution. The systems and methods can be used to track the deposition of several hundreds to thousands of NPs simultaneously and reconstruct their voltammetric curves at the single nanoparticle level, feats not possible through existing electrochemical techniques.

Referring now to FIG. 1, example system (100) can comprise an electrochemical cell (110), a light source (140) configured to illuminate the electrochemical cell and liquid sample comprising an analyte (114) contained therein, and an instrument (150) configured to capture an optical signal from the liquid sample in the electrochemical cell. The electrochemical cell (110) comprises, a working electrode (112) in electrochemical contact with a liquid sample (114), an additional electrode (130) in electrochemical contact with the liquid sample (114) (though more can be present, only one is shown for clarity), a sample containment vessel (116), and a power supply (180). The sample containment vessel (116) comprises a top end (118), a bottom end (120), an exterior surface (122), and an interior void (124) defined by an interior surface (126). The sample containment vessel (116) can be configured such that the bottom end (120) forms a liquid tight seal with the working electrode (112), and the liquid sample (114) is contained in the volume defined by the interior surface (126) of the sample containment vessel (116) and the working electrode (112).

The system (100) can further comprise a computing device (160) configured to receive and process the optical signals from the instrument (150), as well as receive and process signals from the electrochemical cell (110), as discussed in more detail below.

Figure 3:
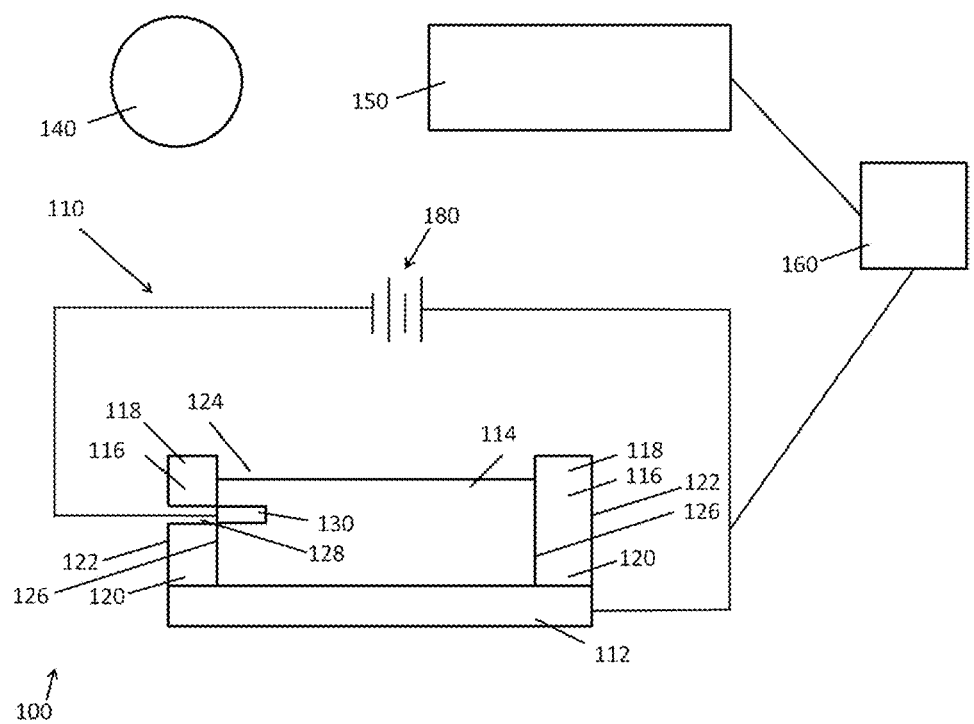
FIG. 3 is a schematic of an exemplary system as disclosed herein for the detection, quantification and/or monitoring of samples with a channel punctuating an interior surface and exterior surface of a sample containment vessel.

Optionally, the sample containment vessel can further comprise a channel. Referring now to FIG. 3, the sample containment vessel (116) can further comprise a channel (128) that punctuates the interior surface (126) and leads through the sample containment vessel (116) to the exterior surface (122) of the sample containment vessel (116). The one or more additional electrodes (130) can be inserted through the channel (128) such that the one or more additional electrodes (130) are in electrochemical contact with the liquid sample (114) and the one or more additional electrodes (130) form a liquid tight seal with the channel (128).

Figure 4:
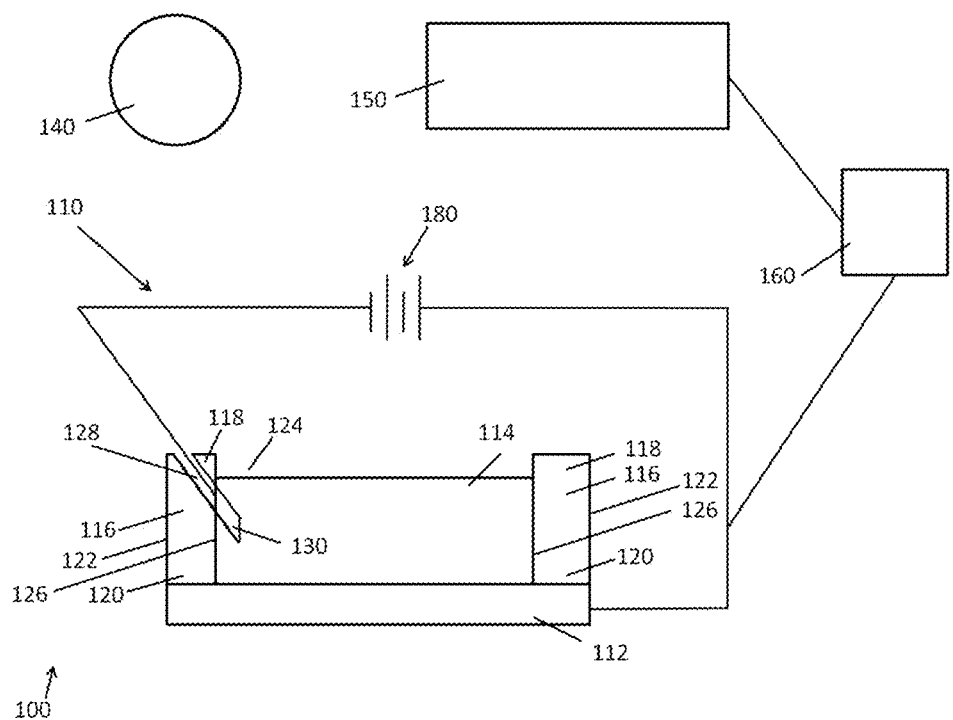
FIG. 4 is a schematic of an exemplary system as disclosed herein for the detection, quantification and/or monitoring of samples with a channel punctuating an interior surface and a top end of a sample containment vessel.

Referring now to FIG. 4, the sample containment vessel (116) can further comprise a channel (128) that punctuates the interior surface (126) and leads through the sample containment vessel (116) to the top end (118) of the sample containment vessel (116), as shown in and, respectively. The one or more additional electrodes (130) can be inserted through the channel (128) such that the one or more additional electrodes (130) are in electrochemical contact with the liquid sample (114) and, optionally in this configuration, the one or more additional electrodes (130) form a liquid tight seal with the channel (128).

In some examples, the sample containment vessel comprises multiple channels through which multiple electrodes or other probes can be inserted.

In some examples, the sample containment vessel further comprises a supporting member comprising a top end, a bottom end, an exterior surface, and an interior void defined by an interior surface. The supporting member can be configured such that the top end forms a liquid tight seal with the working electrode, such that the working electrode is sandwiched within the sample containment vessel.

Figure 5:
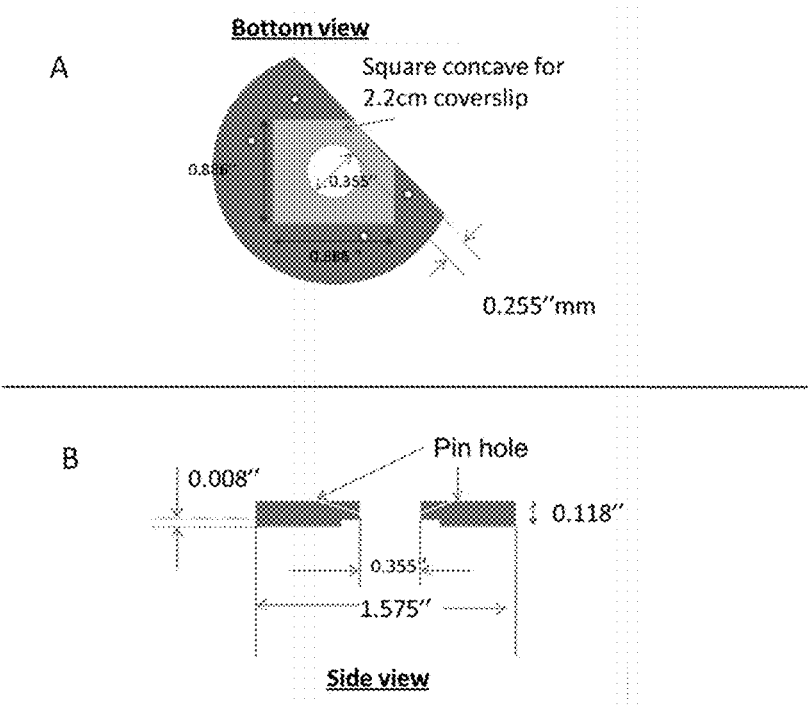
FIG. 5 displays (A) a bottom view and (B) a side view of an example sample containment vessel for an electrochemical cell as disclosed herein.
Figure 6:
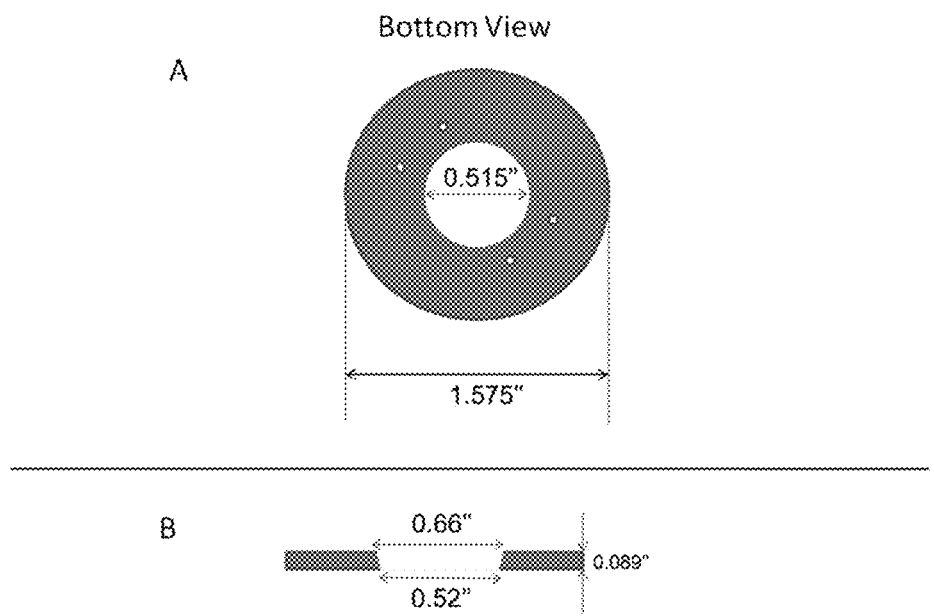
FIG. 6 displays (A) a bottom view and (B) a side view of an exemplary supporting member for an electrochemical cell as disclosed herein.

The sample containment vessel, as well as the components thereof, can be fabricated form any suitable material or combination of materials compatible with the methods described herein. Examples of suitable materials include polymers, silicones, glasses, ceramics, inorganic materials and combinations thereof. In some examples, the interior surface of the sample containment vessel is substantially non-conducting. In some examples, the sample containment vessel comprises a cylindrical piece of a nonconducting material, as shown in FIG. 5. In some examples, the supporting member comprises a cylindrical piece of a nonconducting material, as shown in FIG. 6. In some examples, the nonconducting material is Teflon.

The working electrode and one or more additional electrodes can be fabricated from any suitable material or combination of materials compatible with the methods described herein. In some examples, the working electrode is substantially optically transparent. In some examples, the working electrode comprises an indium tin oxide (ITO) coated microscope coverslip.

The power supply (180) can comprise any additional features suitable for an electrochemical cell. Examples of additional features include, but are not limited to, a voltmeter, an ammeter, a multimeter, an ohmmeter, a signal generator, a pulse generator, an oscilloscope, a frequency counter, a potentiostat, or a capacitance meter. In some examples the power supply (180) is configured to apply a potential to the liquid sample (114). In some examples, the system further comprises a first lens. In some examples, the system further comprises a second lens. The lenses may independently be any type of lens, such as a simple lens, a compound lens, a spherical lens, a toric lens, a biconvex lens, a plano-convex lens, a plano-concave lens, a negative meniscus lens, a positive meniscus lens, a biconcave lens, a converging lens, a diverging lens, a cylindrical lens, a Fresnel lens, a lenticular lens, or a gradient index lens.

Figure 7:
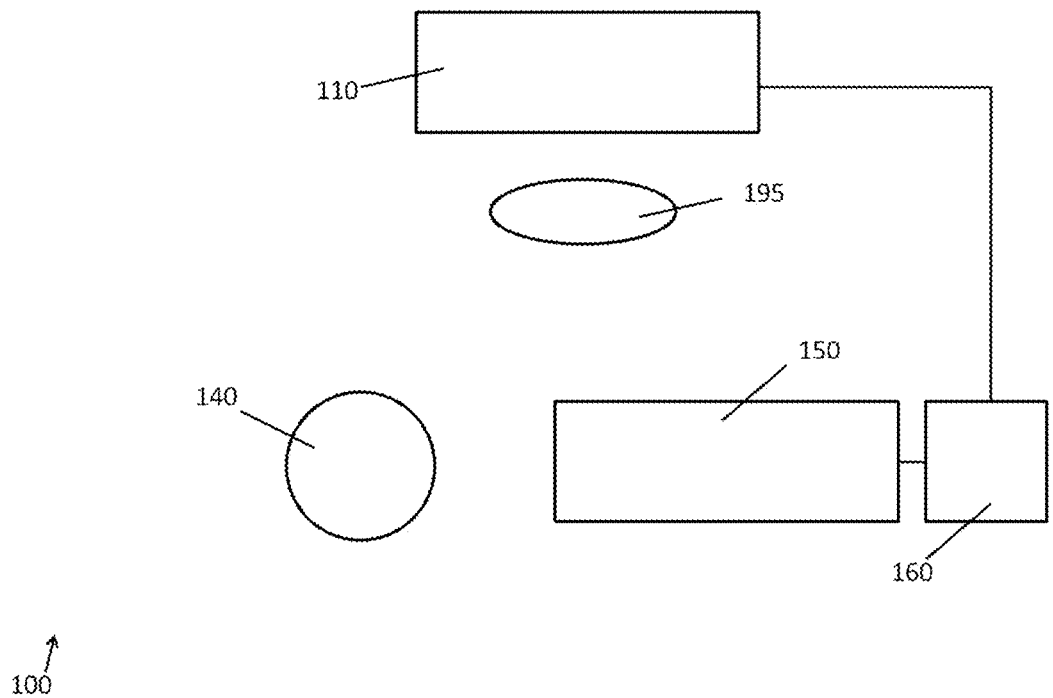
FIG. 7 is a schematic of an exemplary system as disclosed herein that includes a light source and a camera below an electrochemical cell with a lens between the electrochemical cell and the instrument.

In some examples, the system further comprising a first lens can be configured as shown schematically in FIG. 7. Referring now to FIG. 7, the system (100) is configured such that the light source (140) and instrument (150) are below the first lens (195) and the electrochemical cell (110) is above the first lens (195). In some examples, the first lens is a microscope objective.

Figure 8:
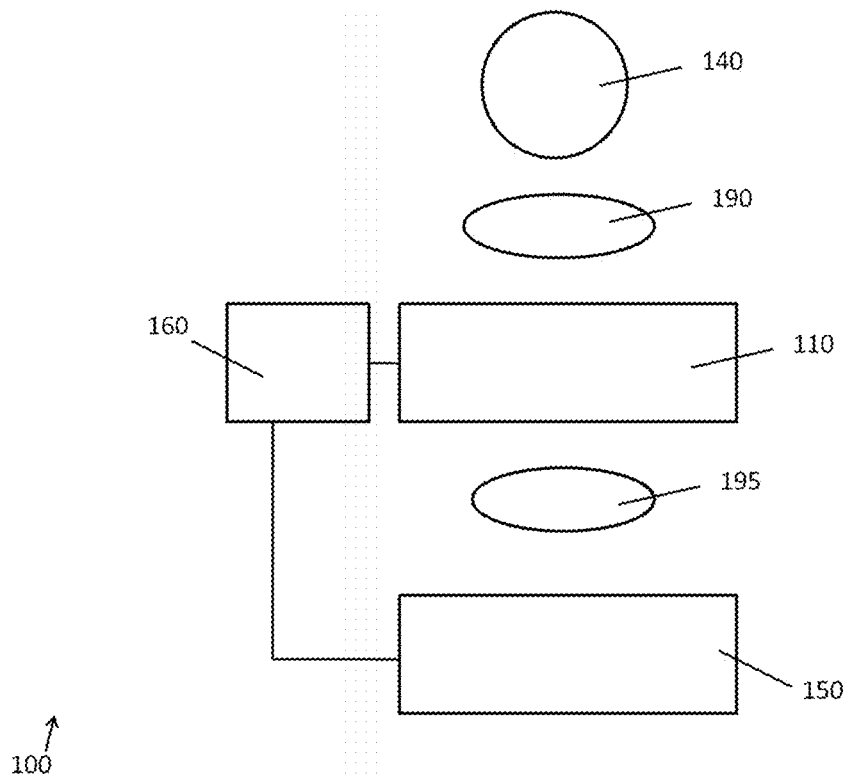
FIG. 8 is a schematic of an exemplary system as disclosed herein that includes a light source above an electrochemical cell, with a lens between the light source and the electrochemical cell, and a camera below the electrochemical cell with another lens between the electrochemical cell and the camera to focus and magnify an optical signal from a sample.
Figure 9:
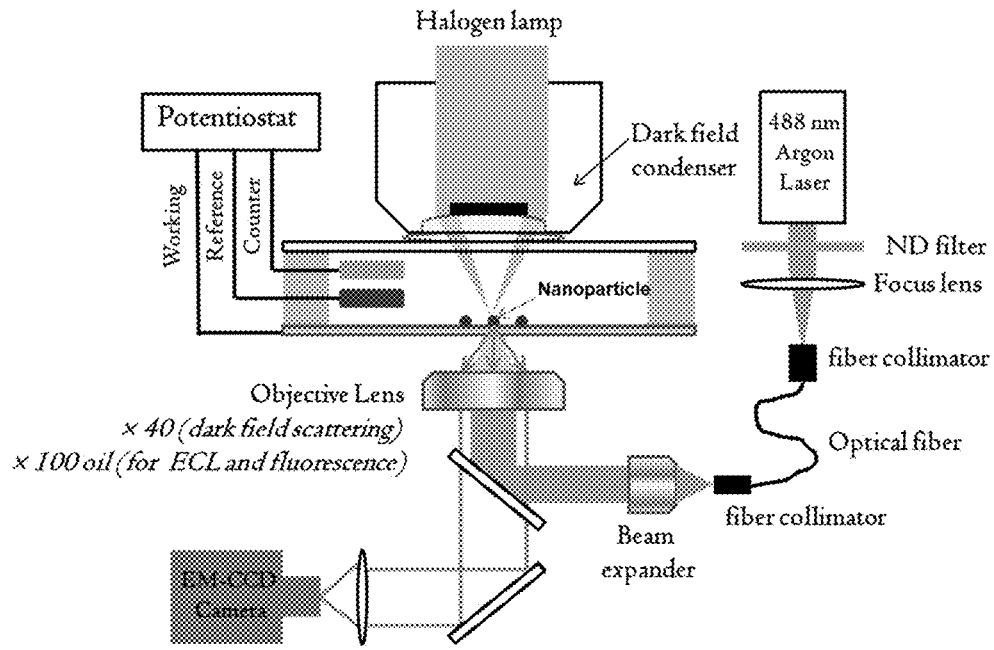
FIG. 9 is a schematic of an exemplary system as disclosed herein that combines the systems shown in FIG. 7 and FIG. 8.
Figure 10:
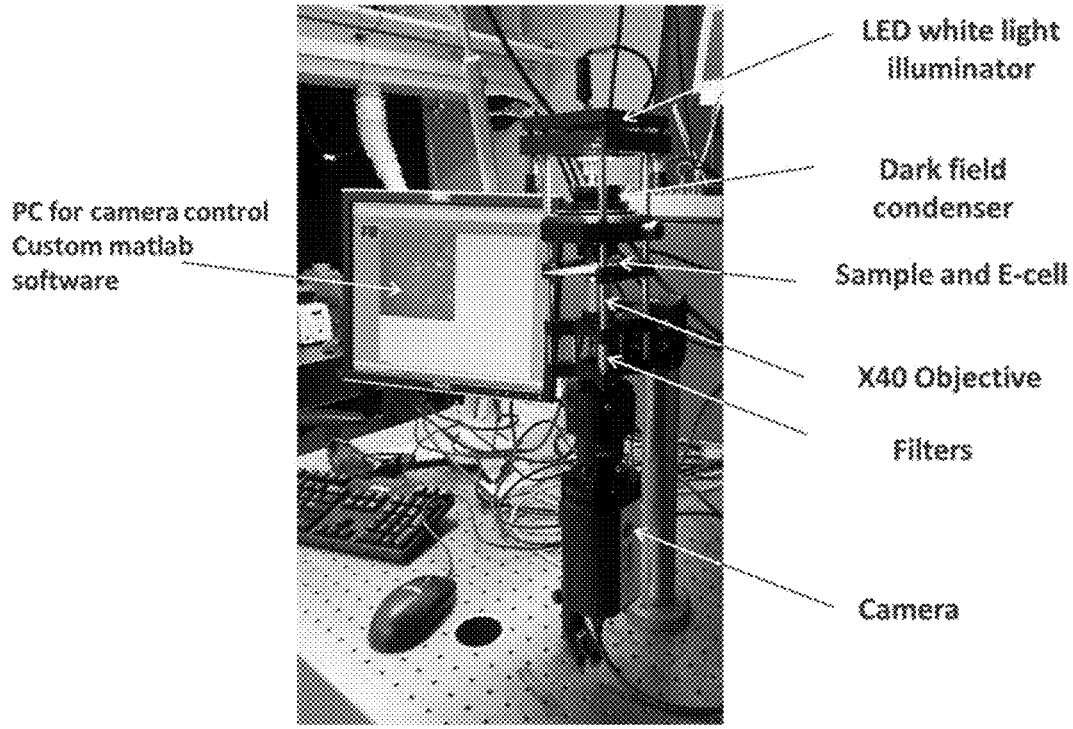
FIG. 10 is a photograph of a working set up of the system described in FIG. 7.

In some examples, the system further comprising a first lens and a second lens can be configured as shown schematically in FIG. 8. Referring now to FIG. 8, the system (100) is aligned such that the first lens (195) is above the instrument (150); the electrochemical cell (110) is above the first lens (195); the second lens (190) is above the electrochemical cell (110); and the light source (140) is above the second lens (190). In some examples, the first lens is a dark field microscope objective and the second lens is a dark field microscope condenser.

The system can further comprise any other suitable optical components. Examples of additional optical components include, but are not limited to, mirrors, beam splitters, filters, lenses, optical fibers, beam expanders, or collimators.

The working electrode can comprise any suitable material. In some examples, the working electrode is substantially optically transparent. In some examples, the working electrode comprises an indium tin oxide (ITO) coated coverslip.

The system (100) can further comprise a first computing device (160) configured to receive and process electrochemical signals from the electrochemical cell, as well as receive and process optical signals from the instrument (150).

Figure 2:
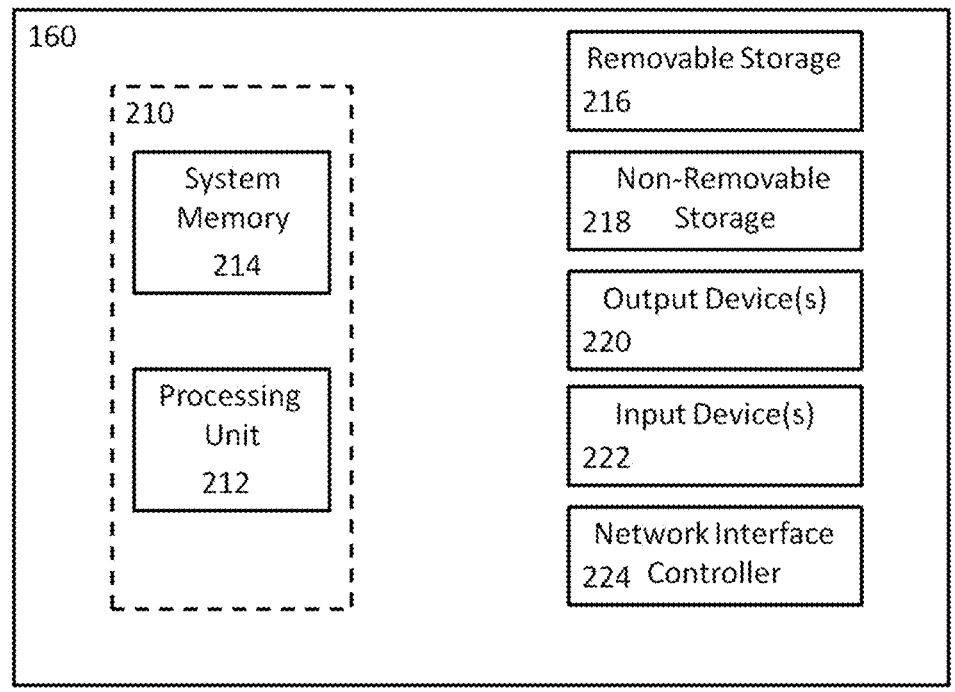
FIG. 2 is a schematic of an exemplary computing device.

FIG. 2 illustrates an example computing device upon which examples disclosed herein may be implemented. The computing device (160) can include a bus or other communication mechanism for communicating information among various components of the computing device (160). In its most basic configuration, computing device (160) typically includes at least one processing unit (212) (a processor) and system memory (214). Depending on the exact configuration and type of computing device, system memory (214) may be volatile (such as random access memory (RAM)), non-volatile (such as read-only memory (ROM), flash memory, etc.), or some combination of the two. This most basic configuration is illustrated in FIG. 2 by a dashed line (210). The processing unit (212) may be a standard programmable processor that performs arithmetic and logic operations necessary for operation of the computing device (160).

The computing device (160) can have additional features/functionality. For example, computing device (160) may include additional storage such as removable storage (216) and non-removable storage (218) including, but not limited to, magnetic or optical disks or tapes. The computing device (160) can also contain network connection(s) (224) that allow the device to communicate with other devices. The computing device (160) can also have input device(s) (222) such as a keyboard, mouse, touch screen, antenna or other systems configured to communicate with the camera in the system described above, etc. Output device(s) (220) such as a display, speakers, printer, etc. may also be included. The additional devices can be connected to the bus in order to facilitate communication of data among the components of the computing device (160).

The processing unit (212) can be configured to execute program code encoded in tangible, computer-readable media. Computer-readable media refers to any media that is capable of providing data that causes the computing device (160) (i.e., a machine) to operate in a particular fashion. Various computer-readable media can be utilized to provide instructions to the processing unit (212) for execution. Common forms of computer-readable media include, for example, magnetic media, optical media, physical media, memory chips or cartridges, a carrier wave, or any other medium from which a computer can read. Example computer-readable media can include, but is not limited to, volatile media, non-volatile media and transmission media. Volatile and non-volatile media can be implemented in any method or technology for storage of information such as computer readable instructions, data structures, program modules or other data and common forms are discussed in detail below. Transmission media can include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit (212) can execute program code stored in the system memory (214). For example, the bus can carry data to the system memory (214), from which the processing unit (212) receives and executes instructions. The data received by the system memory (214) can optionally be stored on the removable storage (216) or the non-removable storage (218) before or after execution by the processing unit (212).

The computing device (160) typically includes a variety of computer-readable media. Computer-readable media can be any available media that can be accessed by device (160) and includes both volatile and non-volatile media, removable and non-removable media. Computer storage media include volatile and non-volatile, and removable and non-removable media implemented in any method or technology for storage of information such as computer readable instructions, data structures, program modules or other data. System memory (214), removable storage (216), and non-removable storage (218) are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device (160). Any such computer storage media can be part of computing device (160).

It should be understood that the various techniques described herein can be implemented in connection with hardware or software or, where appropriate, with a combination thereof. Thus, the methods, systems, and associated signal processing of the presently disclosed subject matter, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs can implement or utilize the processes described in connection with the presently disclosed subject matter, e.g., through the use of an application programming interface (API), reusable controls, or the like. Such programs can be implemented in a high level procedural or object-oriented programming language to communicate with a computer system. However, the program(s) can be implemented in assembly or machine language, if desired. In any case, the language can be a compiled or interpreted language and it may be combined with hardware implementations.

In certain examples, system memory (214) comprises computer-executable instructions stored thereon that, when executed by the processor (212), provide for analysis of signals captured by the instrument (150) and the power supply (180) to obtain information about the liquid sample and/or one or more analytes present in the liquid sample (i.e., one or more sample characteristics, as discussed in more detail below). To implement analysis of this type, system memory (214) can comprise computer-executable instructions stored thereon that, when executed by the processor (212), cause the processor to: receive an electrochemical signal from the power supply; receive an optical signal from the instrument; process the electrochemical signal to obtain an electrochemical parameter; process the optical signal to obtain an optical parameter; optionally correlate the electrochemical parameter to the optical parameter to obtain an optoelectrochemical parameter; and output the electrochemical parameter, the optical parameter, the optoelectrochemical parameter, or combinations thereof.

The electrochemical parameter can be, for example, how the electrochemical signal progresses over time. For example, if the electrochemical signal comprises voltage or current, the electrochemical parameter can be voltage over time or current over time. Similarly, the optical parameter can be, for example, how the optical signal progresses overtime. The optical signal can be, for example, intensity, brightness, scattering, fluorescence, frequency/wavelength, or electrogenerated chemiluminescence. Then, the optical parameter can be, for example, intensity over time, brightness over time, scattering over time, fluorescence over time, frequency/wavelength, or electrogenerated chemiluminescence over time. The optoelectrochemical parameter is a correlation between the optical parameter and the electrochemical parameter. For example, the optoelectrochemical parameter instead of being of a signal progresses over time, can be an expression of how one signal or parameter progresses with relation to the other. For example, how the optical signal or optical parameter progresses in terms of the electrochemical signal or parameter, or vice-versa. For example, the optoelectrochemical parameter can be scattering over voltage, scattering over current, fluorescence over voltage, or fluorescence over current.

The analysis of signals captured by the instrument and power supply can be carried out in whole or in part on one or more computing device. For example, the system may comprise one or more additional computing device.

In certain examples, the instrument comprises a camera. In certain examples, the optical signal comprises an image.

In certain examples, system memory (214) comprises computer-executable instructions stored thereon that, when executed by the processor (212), provide for analysis of images captured by the camera (150) to obtain information about the liquid sample and/or one or more analytes present in the liquid sample. Image analysis can involve fluorescence image analysis, dark field scattering image analysis, electrogenerated chemiluminescence image analysis, or combinations thereof. For example, the analysis can be dark field scattering image analysis. The data can be saved as a series of image files, or "frames". The first frame can be subtracted from each subsequent frame to correct for any static defects. Next, all the frames can be summed together to yield an image depicting total scattering intensity throughout the experiment. Gradient filtering methods can be used to enhance the contrast within the image. A threshold can be set to differentiate between "active" (scattering) and "inactive" (not scattering) pixels. Adjacent pixels can be grouped together to form "spots". The scattering intensity can then be extracted on a frame-by-frame basis by taking the maximum of the individual pixel intensities for each spot. In some examples, the scattering intensity can be further processed to obtain a different characteristic from the sample. For example, if the liquid sample comprises metal ions that can form nanoparticles upon the application of sufficient voltage, the scattering intensity from the particles can be processed using appropriate theoretical models (i.e. Mie theory) to ultimately give nanoparticle size.

The light source present in the systems described above can be any type of light source. In some examples, the system can include a single light source. In other examples, more than one light source can be included in the system. Examples of suitable light sources include natural light sources (e.g., sunlight) and artificial light sources (e.g., incandescent light bulbs, light emitting diodes, gas discharge lamps, arc lamps, lasers etc.). In some examples, the light source is an arc lamp. In some examples, the light source is a laser.

Methods for the detection, quantification, and/or monitoring of analytes, including nanoparticles, in liquid samples are also provided. The methods can involve the use of optical signal and/or electrochemical signal analysis to detect, quantify and/or monitor analytes, including nanoparticles, in a liquid sample. The methods can be performed using the systems described above. Methods for the detection, quantification, and/or monitoring of analytes can comprise providing an electrochemical cell comprising a working electrode in electrochemical contact with a liquid sample comprising an analyte, a sample containment vessel, one or more additional electrodes in electrochemical contact with the liquid sample and a power supply electrically coupled to the working electrode and the one or more additional electrodes. The sample containment vessel can comprise a top end, a bottom end, an exterior surface and an interior void defined by an interior surface, wherein the bottom end forms a liquid tight seal with the working electrode and the liquid sample is contained in the volume defined by the interior void of the sample containment vessel and the working electrode. Methods can further comprise capturing an electrochemical signal from the power supply, capturing an optical signal from the electrochemical cell, processing the electrochemical signal to obtain an electrochemical parameter, processing the optical signal to obtain an optical parameter, and optionally correlating the optical parameter to the electrochemical parameter to obtain an optoelectrochemical parameter.

In some examples, the sample containment vessel can further comprise a channel that punctuates the interior surface and leads through the sample containment vessel to the exterior surface or the top end of the sample containment vessel. The one or more additional electrodes can be inserted through the channel such that the one or more additional electrodes are in electrochemical contact with the liquid sample and the one or more additional electrodes form a liquid tight seal with the channel In some examples, the sample containment vessel comprises multiple channels through which multiple electrodes or other probes may be inserted.

In some examples, the sample containment vessel further comprises a supporting member comprising a top end, a bottom end, an exterior surface, and an interior void defined by an interior surface. The supporting member can be configured such that the top end forms a liquid tight seal with the working electrode, such that the working electrode is sandwiched within the sample containment vessel.

The sample containment vessel, as well as the components thereof, can be fabricated form any suitable material or combination of materials compatible with the methods described herein. Examples of suitable materials include polymers, silicones, glasses, ceramics, inorganic materials and combinations thereof. In some examples, the interior surface of the sample containment vessel is substantially non-conducting. In some examples, the sample containment vessel comprises a cylindrical piece of a nonconducting material, as shown in FIG. 5. In some examples, the supporting member comprises a cylindrical piece of a nonconducting material, as shown in FIG. 6. In some examples, the nonconducting material is Teflon.

The working electrode and second electrode can be fabricated from any suitable material or combination of materials compatible with the methods described herein. In some examples, the working electrode is substantially optically transparent. In some examples, the working electrode comprises an indium tin oxide (ITO) coated microscope coverslip.

In certain examples, the optical signal can comprise dark field scattering images. Methods for processing the dark field scattering images can comprise saving the images as a series of image files, or "frames". The first frame is subtracted from each subsequent frame to correct for any static defects. Next, all the frames are summed together to yield an image depicting total scattering intensity throughout the experiment. Gradient filtering methods can be used to enhance the contrast within the image. A threshold can be set to differentiate between "active" (scattering) and "inactive" (not scattering) pixels. Adjacent pixels can be grouped together to form "spots". The scattering intensity can then be extracted on a frame-by-frame basis by taking the maximum of the individual pixel intensities for each spot. In some examples, the scattering intensity can be further processed to obtain a different characteristic from the sample. For example, if the liquid sample comprises metal ions that can form nanoparticles upon the application of sufficient voltage, the scattering intensity from the particles can be processed using appropriate theoretical models (i.e. Mie theory) to ultimately give nanoparticle size.

In some examples, the analyte can include nanoparticles. In some examples, the optical signal comprises dark field scattering, which can be processed using theoretical methods (i.e., Mie theory) to determine nanoparticles size. In some examples, the optoelectrochemical parameter comprises the potential at which individual nanoparticles, clusters of nanoparticles, or a combination thereof, of a specific size are formed.

Also disclosed herein are sample containment vessels. The sample containment vessel can comprise a top end, a bottom end, an exterior surface and an interior void defined by an interior surface. In some examples, the sample containment vessel is configured to receive a working electrode such that the bottom end forms a liquid tight seal with the working electrode. In some examples, the volume defined by the interior void of the sample containment vessel and the working electrode is configured to contain a liquid sample, and the working electrode can be in electrochemical contact with the liquid sample. In some examples, the sample containment vessel further comprises a channel that punctuates the interior surface of the sample containment vessel and leads through the sample containment vessel to the top end or exterior surface of the sample containment vessel. In some examples, the channel is configured to receive one or more additional electrodes such that the one or more additional electrodes are in electrochemical contact with the liquid sample and the one or more additional electrodes form a liquid tight seal with the channel.

In some examples, the sample containment vessel can further comprise a channel that punctuates the interior surface and leads through the sample containment vessel to the exterior surface or the top end of the sample containment vessel. The one or more additional electrodes can be inserted through the channel such that the one or more additional electrodes are in electrochemical contact with the liquid sample and the one or more additional electrodes form a liquid tight seal with the channel In some examples, the sample containment vessel comprises multiple channels through which multiple electrodes or other probes may be inserted.

In some examples, the sample containment vessel further comprises a supporting member comprising a top end, a bottom end, an exterior surface, and an interior void defined by an interior surface. The supporting member can be configured such that the top end forms a liquid tight seal with the working electrode, such that the working electrode can be sandwiched within the sample containment vessel.

The sample containment vessel, as well as the components thereof, can be fabricated form any suitable material or combination of materials compatible with the methods described herein. Examples of suitable materials include polymers, silicones, glasses, ceramics, inorganic materials and combinations thereof. In some examples, the interior surface of the sample containment vessel is substantially non-conducting. In some examples, the sample containment vessel comprises a cylindrical piece of a nonconducting material, as shown in FIG. 5. In some examples, the supporting member comprises a cylindrical piece of a nonconducting material, as shown in FIG. 6. In some examples, the nonconducting material is Teflon.

The volume defined by the interior void of the sample containment vessel can vary based on the particular application. In some examples, the volume defined by the interior void of the sample containment vessel can be 1 mL or less (e.g., 900 µL or less, 800 µL or less, 700 µL or less, 600 µL or less, 500 µL or less, 400 µL or less, 300 µL or less, 200 µL or less, 100 µL or less, 90 µL or less, 80 µL or less, 70 µL or less, 60 µL or less, 50 µL or less, 40 µL or less, 30 µL or less, 20 µL or less, or 10 µL or less). In some examples, the volume defined by the interior void of the sample containment vessel can be 1 µL or more (e.g., 10 µL or more, 20 µL or more, 30 µL or more, 40 µL or more, 50 µL or more, 60 µL or more, 70 µL or more, 80 µL or more, 90 µL or more, 100 µL or more, 200 µL or more, 300 µL or more, 400 µL or more, 500 µL or more, 600 µL or more, 700 µL or more, 800 µL or more, or 900 µL or more). The volume defined by the interior void of the sample containment vessel can range from any of the minimum values described above to any of the maximum values described above, for example from 1 µL to 1 mL (e.g., from 1 µL to 500 µL, from 500 µL to 1 mL, from 1 µL to 200 µL, from 200 µL to 500 µL, from 500 µL to 700 µL, from 700 µL to 1 mL, or from 300 µL to 1 mL).

In some examples, the sample containment vessel is configured to reside in a microscope.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example 1

Indium-Tin-Oxide (ITO)-coated coverglass substrates (0.15 mm thick, 15-30 Ω/sq, SPI) were cleaned by sequential sonication for 10 min each in a mild detergent solution, DI $H_2O$, isopropanol, and DI $H_2O$ followed by drying under a stream of $N_2$. A Ni TEM grid (SPI) was attached to the substrate using standard laboratory labeling tape. Al (~100 nm) was then thermally deposited through the TEM grid at a pressure of ~$10^{-6}$ torr. The tape and TEM grid were carefully taken off and the substrates were swabbed with $CHCl_3$ to remove the residual adhesive. The sonication procedure was repeated before using the substrates for the electrodeposition experiments.

The electrochemical cell used for these experiments was machined from Teflon. It was designed to use a 0.15 mm thick working electrode and wire counter/reference electrodes while being thin enough to fit within the optical path of a dark field microscope. The previously described ITO substrates were used as working electrodes, along with a Pt wire and a Ag wire as counter and quasi-reference electrodes, respectively. The electrolyte solution for depositions comprised 300 µM Ag Acetate (99%, Acros Organics) and 0.1 M LiClO$_4$ (99.99%, Aldrich) in MeCN (HPLC Grade, EMD). An electrolyte solution containing 1 mM Ferrocene MeOH (97%, Aldrich) and 0.1 M LiClO$_4$ was used for calibration of the QRE.

Light from an Hg arc lamp (X-Cite 120 PC Q) was focused onto the substrate surface by a dark field condenser (0.8-0.92 NA, Olympus). Scattered light was collected through a 40×, 0.75 NA objective and imaged using an electron multiplying charge coupled device (EM-CCD) camera (Andor iXon). No EM Gain was used for these measurements. Each pixel of the CCD represented an actual sample area of about 380×380 nm. Scattering images of the substrate surface during electrodeposition were recorded at a time resolution of 50 ms. The start of data collection was controlled by a triggering pulse from the potentiostat.

The electrode current was measured as the potential of the ITO electrode was swept at 100 mV/s from 0 V to −0.3 V vs. the Ag QRE using a potentiostat (760C, CH Instruments). The Ag QRE electrode was calibrated by cyclic voltammetry in the Ferrocene MeOH reference solution described previously. All potentials were subsequently reported against the standard hydrogen electrode (SHE). For the cyclic voltammetry experiment, the potential was ramped from ~0 V to −0.5 V to ~1 V vs. the Ag QRE at 100 mV/s.

SEM analysis of the deposited Ag was carried out at a 20 keV accelerating voltage on a JEOL 7000 FE-SEM. The area imaged optically via electrodeposition was first located with the aid of the deposited Al index and imaged at low magnification. After correlating individual spots in the SEM and scattering images, the sample was imaged again at high magnifications to obtain particle sizes for about 40 scattering centers on the substrate.

Custom MATLAB software was used to extract particle scattering transients. An outline of the process is given below.
- The data was initially saved as a TIFF stack (series of tagged image file format images, or "frames").
- The first frame was subtracted from each subsequent frame. This corrected for any static defects/particles on the sample surface that may scatter light.
- All frames were summed together to yield an image depicting total scattering intensity throughout the experiments.
- Simple gradient filtering methods were used to enhance contrast within the image, if necessary.
- A threshold was set to differentiate between "active" (scattering) and "inactive" (no scattering) pixels.
- Adjacent pixels were grouped together to form "spots".
- Scattering intensity was then extracted on a frame-by-frame basis by taking the maximum of the individual pixel intensities for each spot, resulting in single particle "transients".

Figure 11:
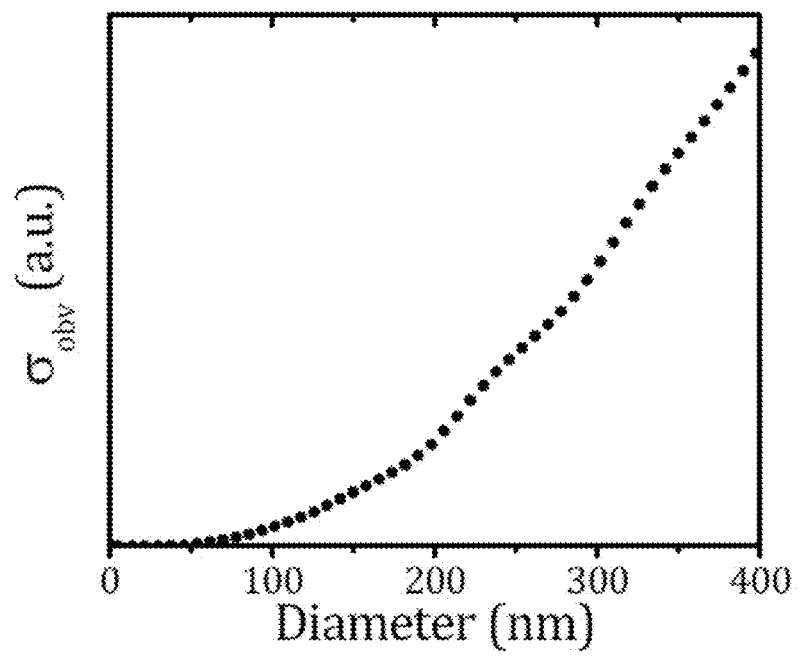
FIG. 11 is a graph showing a theoretical scattering cross-section as a function of particle size.

Calculations for theoretical scattering-size curves were carried out according to the Mie solution for scattering from a homogeneous sphere. The cross-section representing the scattered light between polar angles $\theta_i \pm \frac{1}{2}\Delta\theta$ was calculated as:

$$\sigma_i(k, r, \theta_i, \Delta\theta) = \frac{2\pi}{k^2} \int_{\theta_i - \frac{1}{2}\Delta\theta}^{\theta_i + \frac{1}{2}\Delta\theta} S_{11}(k, r, \theta) d\theta \quad (1)$$

where k is the wavenumber of the scattered radiation and r the particle radius. The scattering matrix element $S_{11}$ was calculated via MATLAB programs, which followed a well-established algorithm (Bohren, C F; Huffman, D R. *Absorption and Scattering of Light by Small particles*. 1983). Values for the complex refractive index of Ag (*Handbook of Optical Constants of Solids*, Palik, 1985), MeCN (n=1.3442, *CRC Handbook of Chemistry and Physics*, Lide, 2008), and ITO (Sopra Materials Database) were obtained from the indicated sources. The Ag and ITO refractive indices were functions of scattering wavelength, which were interpolated as necessary to yield values at wavelengths matching those at which the lamp intensity was measured. The medium refractive index used for these calculations was taken to be an average of the MeCN and ITO values, and an angular resolution of 1 degree was used. The observed scattering intensity at the detector was modeled as:

$$I_i(r;\theta_i,\Delta\theta) = \omega \int \sigma_i(k,r;\theta_i,\Delta\theta) I_{lamp}(k) \eta_{CCD}(k) \eta_{coll}(\theta_i) dk$$

$$I_{obs}(r) = \Sigma_i I_i(r;\theta_i,\Delta\theta) \quad (2)$$

where $I_{lamp}$ is the lamp intensity, $\eta_{CCD}$ is the detector quantum efficiency, and $\eta_{coll}$ is the optical collection efficiency. $\chi$ is an empirical factor used to account for variations in lamp intensity/optical collection efficiency; this is the factor allowed to vary in the data fitting process. The lamp intensity/CCD efficiency factors are straightforward to obtain. The collection efficiency term was defined as:

$$\eta_{coll}(\theta_i) = \frac{1}{2\pi} \int_0^{2\pi} M_{coll}(\theta_i, \varphi) d\varphi \quad (3)$$

$$M_{coll}(\theta, \varphi) = \begin{cases} 1 & \text{if } \theta_{obj} < 48.6° \\ 0 & \text{otherwise} \end{cases}$$

$$\theta_{obj} = \arcsin\left(\frac{n_{med}\sin(\arccos(\sin\theta\cos\varphi\sin\theta' + \cos\theta\cos\theta'))}{n_{air}}\right)$$

where $\theta'$ is the angle between the incident light path and the objective axis (59.3°). This expression makes the geometric assumption that all scattered light which leaves the sample at an angle smaller than the acceptance defined by the objective lens (NA=0.75) will be collected. Here, again, $n_{med}$ was taken to be an average of ITO and MeCN values. This resulting scattering cross section-size curve for the calculations presented here is given in FIG. 11.

All data fitting was carried out using the "fminsearch" function (which follows the Nelder-Mead algorithm) in MATLAB. First, the extracted single particle transients were fit to sigmoidal functions:

$$I(E) = I_{bg} + \frac{A_{sig}}{1 + e^{k(E - E_{1/2})}} \quad (4)$$

The average R² value for single NP transient fits was about 0.994. The amplitudes ($A_{sig}$) were used as the values for the final particle scattering intensity. The "turn-on" potential, $E_{on}$, was defined as:

$$E_{on} = E_{1/2} + 2k^{-1} \quad (5)$$

Figure 12:
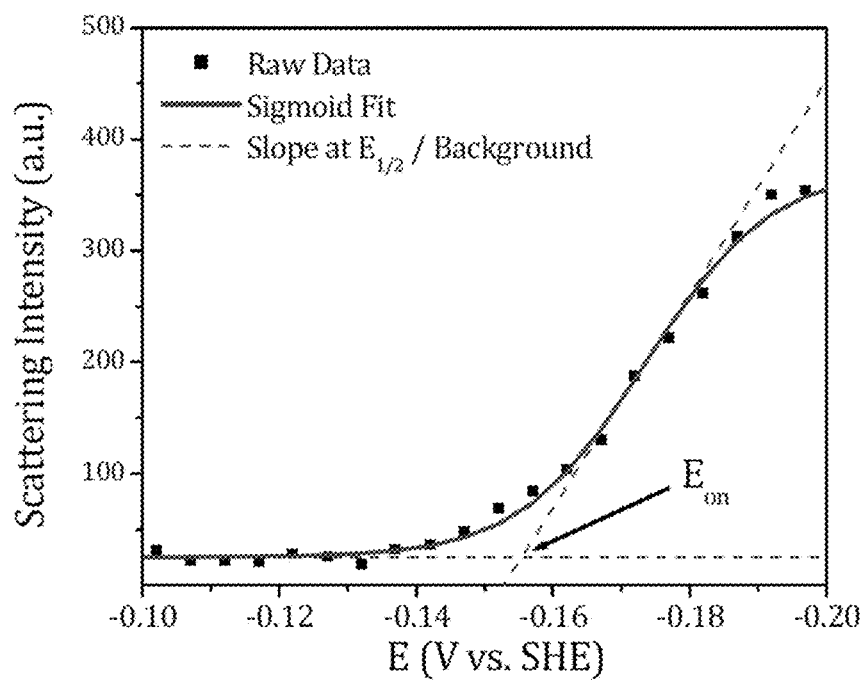
FIG. 12 is a graphical depiction of a turn-on potential calculation.

$E_{on}$ is illustrated graphically in FIG. 12. Fitting of the experimental single particle scattering-size curve (generated by plotting sigmoid amplitude, $A_{sig}$, as a function of particle size obtained via SEM) to the theoretical curve was used to generate a value for $\chi$ which effectively correlated the observed scattering intensity with particle size. From this point, the scattering intensity for individual particles was interpolated to obtain radius-potential curves. Single particle currents were generated according to:

$$i(t) = \frac{dQ_{dep}(t)}{dt} \quad Q_{dep}(t) = \frac{\rho_{Ag} F}{M_{Ag}} V_{NP}(t) \quad (6)$$

$$i(t) = \frac{\rho_{Ag} F}{M_{Ag}} \frac{dV_{NP}(t)}{dt} = \frac{\rho_{Ag} F}{M_{Ag}} \frac{d}{dt}\left(\frac{4}{3}\pi r(t)^3\right)$$

$$i(t) = \left(\frac{4\pi \rho_{Ag} F}{M_{Ag}}\right) r(t)^2 \frac{dr(t)}{dt}$$

These relations make the assumption of uniform spherical growth of the particles. Here, $Q_{dep}$ represents the total charge passed due to the reduction of $Ag^+$. $\rho_{Ag}$, F, and $M_{Ag}$ are the density of silver, Faraday's constant, and atomic weight of Ag, respectively. r is the nanoparticle's radius.

Figure 13:
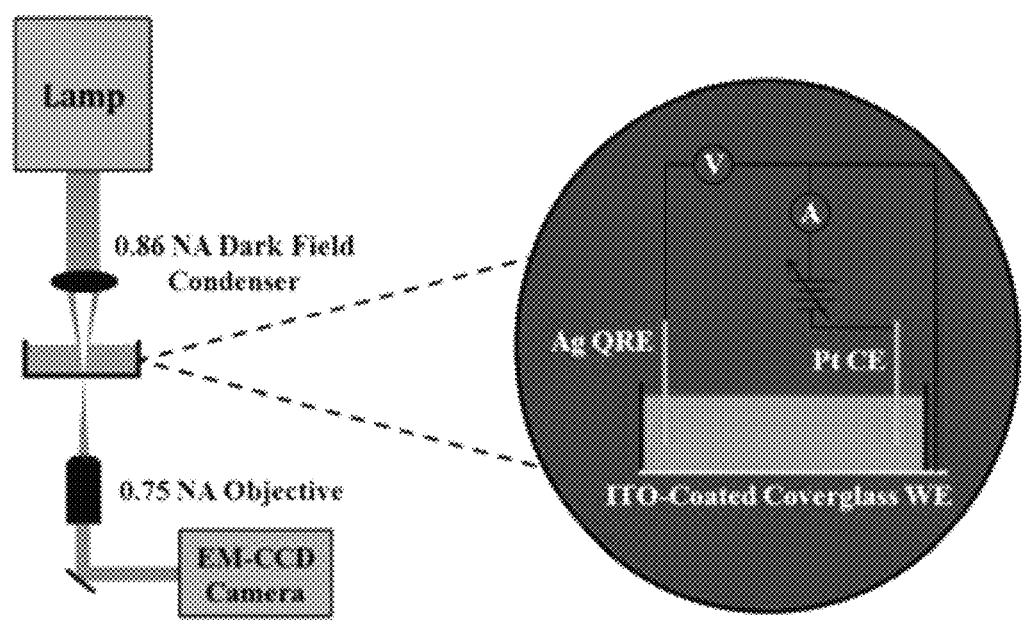
FIG. 13 is a schematic of the experimental setup for the dark field scattering spectroelectrochemistry experiments.
Figure 14:
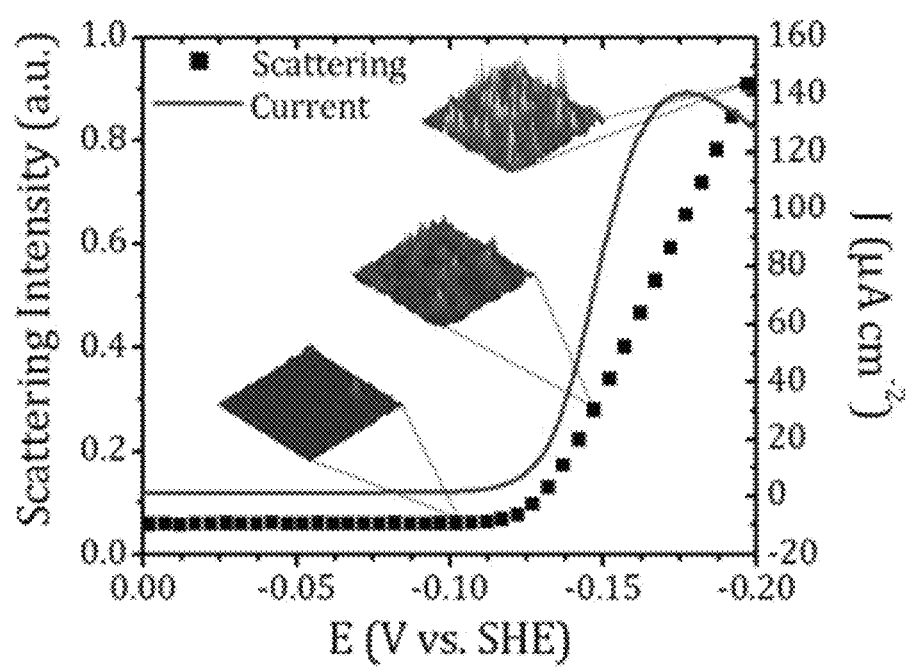
FIG. 14 is a graph showing the total measured scattering intensity and bulk current density during a potential sweep. The insets are scattering images (~40 μm×40 μm) at the indicated points along the sweep.
Figure 15:
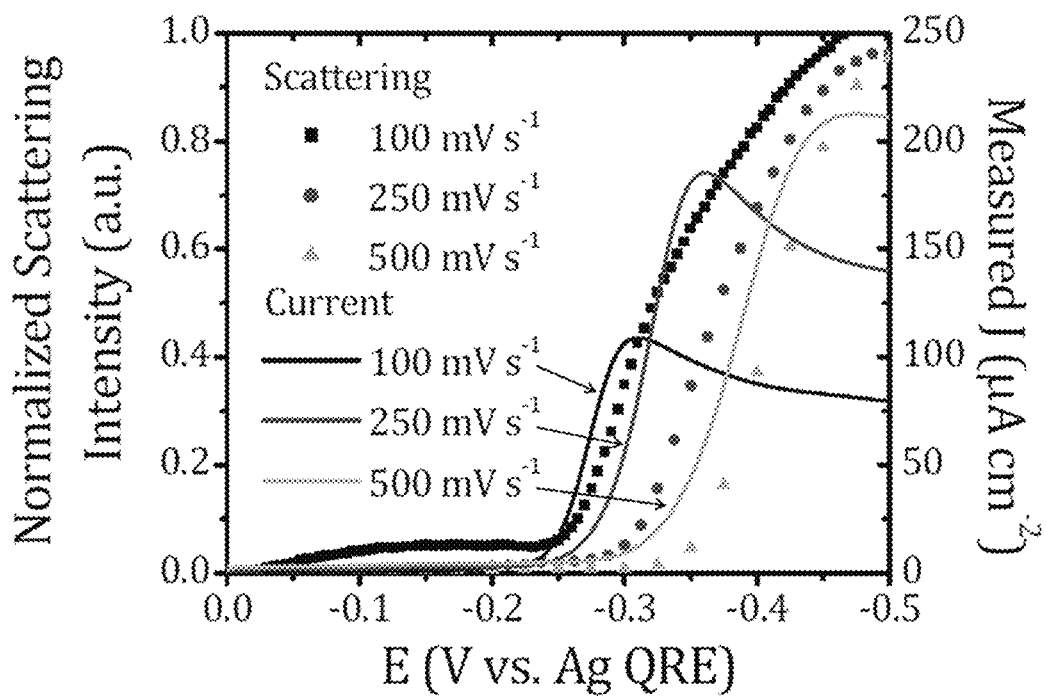
FIG. 15 shows linear sweep voltammograms and total substrate scattering intensities for different potential sweep rates.

The experimental setup can be seen in FIG. 13. Ag particles were deposited from MeCN containing Ag acetate and $LiClO_4$ by ramping the ITO electrode potential cathodically (~0.1 V to −0.2 V vs. SHE). Simultaneously, light scattering at the electrode surface was imaged over a ~100× 100 µm sample area. Upon the application of sufficiently cathodic potentials, light scattering due to the presence of deposited AgNPs on the ITO electrode becomes detectable. This can be seen visually in the inset images in FIG. 14, given at the indicated points along the sweep. The total measured scattering intensity and measured electrode current are included for reference. This total scattering intensity across the electrode surface exhibits shifts towards more negative potentials as one would expect with increasing sweep rates (FIG. 15), due to the slow kinetics of $Ag^+$ reduction at ITO.

Individual diffraction limited spots (FWHM=~350 nm) were resolved in the scattering images. For data analysis, spot location was carried out through custom MATLAB programs and resulted in several hundreds to thousands being detected per sample. For the sample depicted in FIG. 14, 770 spots were detected, resulting in an apparent surface density of 7.55×10⁶ spots·cm⁻². The average distance between a given spot and its nearest neighbor is about 2.8 µm. This resulting density can be rationalized by considering the growth of spherical diffusion layers originating from nucleation sites on the electrode surface; the diffusion layer overlapping resulting from the deposition of individual particles would control the effective final particle sizes and density. Due to this well documented behavior, and the scanning electron microscopy (SEM) data to be discussed later, the diffraction limited spots in the final scattering images correspond to either "lone" or a few closely "grouped" particles, though it's likely the observed particles result from several nucleation sites early in the deposition process.

Figure 16:
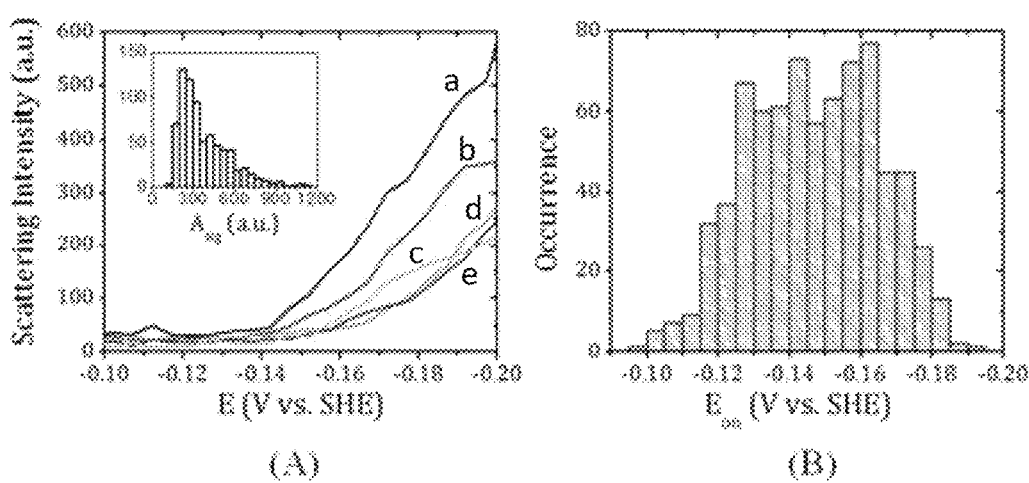
FIG. 16 shows example individual particle scattering transients (A), histograms of the final light scattering intensity ("$A_{sig}$", inset of A), and "turn-on" potential obtained from the data fitting (B).
Figure 17:
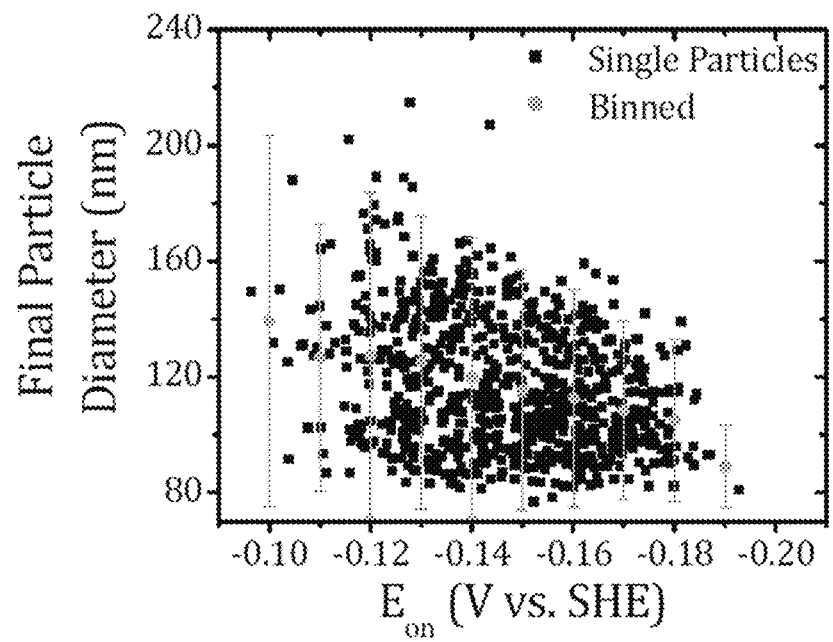
FIG. 17 is a plot of final particle radius (determined from $A_{sig}$ values) as a function of $E_{on}$. The circles indicate binned (10 mV) averages and the squares represent single particles. Error bars are two standard deviations.

Some example scattering-potential transients for individual spots are given in FIG. 16A. The individual scattering transients were fit to obtain distributions of final scattering intensities ($A_{sig}$), as shown as inset of FIG. 16, and light scattering "turn-on" potentials ($E_{on}$) as shown in FIG. 16. Detailed data fitting procedures are described above. The distribution of final scattering intensities is correlated with the final shape and size of the particles. $E_{on}$ physically represents the electrode potential at which the scattering of light by the particle becomes detectable, which is dependent on the experimental configuration. For the configuration employed herein, the limit of detection in terms of particle diameter is about 46 nm (using a definition of 3 times the detection noise). The distribution in $E_{on}$ values reflects a combination of several factors, including (1) variations in the required overpotential to drive $Ag^+$ reduction at different sites on the ITO surface, (2) the proximity/overpotential of neighboring sites on the surface, and (3) variations in particle geometry and/or orientation with respect to the substrate. The observed $E_{on}$ values span a 60 mV range. Variations in the local overpotential could be due to inherent variations in the defect sites on the ITO surface at which deposition occurs or to local variations in contact area with or conductivity of the ITO electrode. The $E_{on}$ and $A_{sig}$ parameter values for individual NPs were found to be weakly correlated, with a more negative turn-on potential corresponding to a smaller final scattering intensity (FIG. 17). The observed weak correlation can be due to several competing factors that affect the final deposited particle size: variations in the local ITO conductivity, distance from neighboring particles, and the potential at which those particles began to grow.

While these results provide qualitative insight into the heterogeneity in the reduction of $Ag^+$ at ITO, quantitative information on fundamental electrochemical parameters (reaction half potentials, kinetic parameters, etc.), rather than the empirical analysis discussed thus far, can also be provided. This can be done by correlating the observed scattering signal with the actual particle size.

Figure 18:
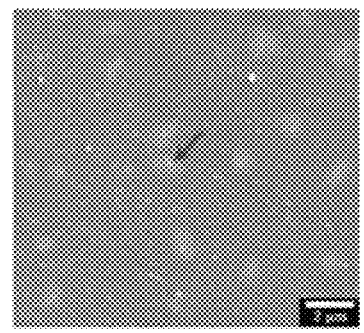
FIG. 18 contains a low magnification SEM image of deposited Ag particles (A), high magnification SEM image of the indicated particle (B), histogram of particle sizes obtained through SEM analysis (C), and results of single particle scattering-size correlations (D). The overlay in (A) is generated from the corresponding dark field scattering image (FIG. 19).
Figure 18:
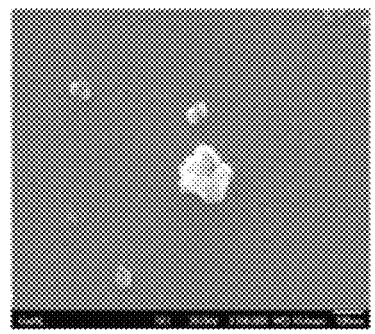
Figure 18:
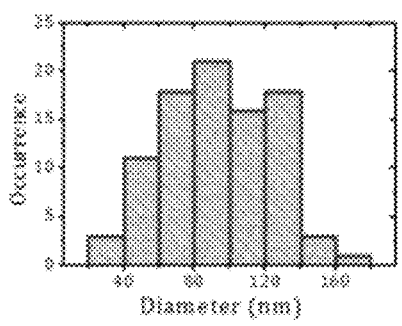
Figure 18:
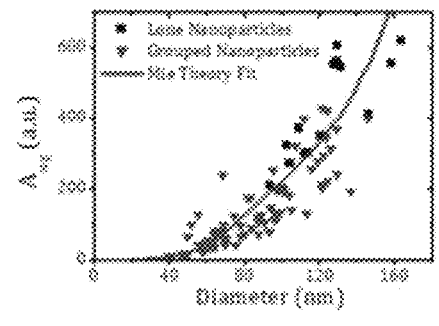
Figure 19:
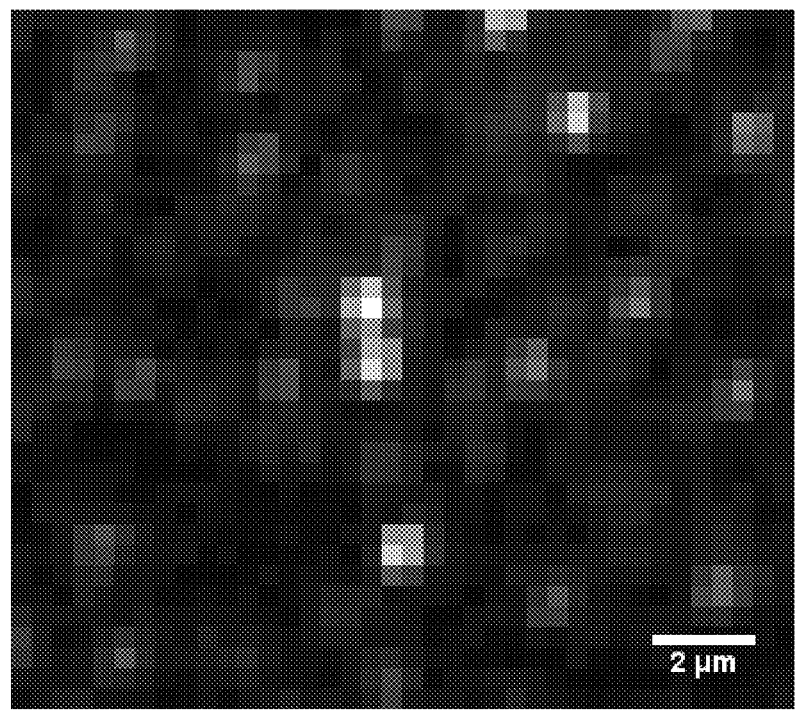
FIG. 19 is a dark field scattering image of the deposited Ag particles depicted in FIG. 18.

The measured scattering intensity can be expressed as Equation 2, as discussed above. $\chi$ is a factor which accounts for the absolute lamp intensity at the sample surface, and is the quantity varied to perform the data fitting. While the calculation of $\sigma_i$ for spherical, homogeneous metal particles can be carried out directly using Mie theory; not knowing explicit values for all of the other quantities prevents one from obtaining a direct relationship between scattering intensity and particle size. To address this issue, correlated SEM measurements were carried out on the deposited particles. The particles corresponding to spots in the scattering image were identified via SEM and sized. Example SEM images can be seen in FIGS. 18A and B. The image in FIG. 18A is overlaid with the scattering image obtained during the deposition process (FIG. 19) Immediately evident is that there are particles on the ITO surface not visible in the scattering image. These particles are a combination of stray Al particles created during the deposition of the Al index and deposited Ag particles too small to be detected via scattering. The Al particles (and any other static defect) are ignored in the scattering analysis through a background correction procedure. The SEM analysis made it possible to unambiguously attribute the spots in the scattering image to scattering from lone or closely grouped particles. Of the ~40 correlated areas for the sample discussed here, roughly one-third could be unambiguously assigned to individual particles. More careful control over deposition parameters (e.g., employing a dual potential step instead of a sweep) can eliminate this issue by lowering the particle surface density further. The morphology of the deposited particles was found to be roughly spherical in nature. A histogram of obtained particle sizes is given in FIG. 18C. The relationship between the scattering intensity and particle size for the lone particles can be observed in FIG. 18D (squares). The proper value of $\chi$ is obtained by a numerical fitting procedure using the scattering intensity values for the lone particles. The result of this fitting procedure is given as the curve in FIG. 18D. For the spots found to correspond to small groups of particles, individual particle intensities can be extracted from the measured intensity according to the theoretical curve profile. The result of this process for the "grouped" spots in the SEM analysis is the triangles in FIG. 18D. This illustrates that even in cases where a given diffraction limited spot does not correlate to an individual particle, the Mie theory approximation used in this analysis can still accurately agree with the measured intensity.

Once the final scattering intensities have been "calibrated" against the SEM data, it becomes possible to convert single NP scattering transients into corresponding size transients. This process was carried out blindly for all 770 spots imaged optically. Once radius potential curves are in hand, it is then possible to estimate the Faradaic current for $Ag^+$ reduction contributing to a given particle's growth according to equation 6. Example single particle voltammograms can be seen in FIG. 20A along with the distribution of peak potentials. Using the resulting single particle currents and the observed particle surface density, the bulk faradaic current density was then estimated from the scattering data and compared to the current density measured by the potentiostat (FIG. 20B). The agreement between the calculated and measured current densities is impressive and supports the validity of the single NP scattering analysis. The discrepancy at more cathodic potentials can be due to the presence of undetected Ag particles, differing particle size distributions between the entire working electrode (~2 cm$^2$) and 100×100 µm imaged area, or to non-Faradaic processes occurring at the working electrode which are effectively ignored in the scattering analysis. Disagreement due to non-Faradaic processes actually highlights an important inherent advantage to this technique: the only processes which contribute to scattering signal are those considerably altering either the morphology of the nanoparticle or its surrounding dielectric environment.

Figure 20:
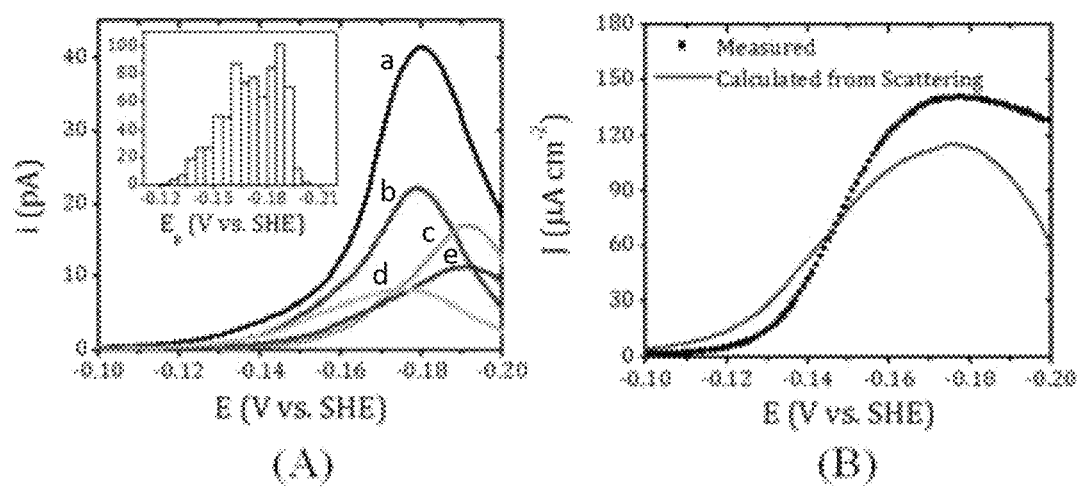
FIG. 20 shows an example reconstructed voltammetric curves for single particles (A), histogram of peak potentials (inset of A), and a comparison of measured and calculated bulk current densities obtained through the scattering calculations for all 753 particles (B).

In order to obtain single particle i-E curves such as those given in FIG. 20, no assumptions about the electrochemical behavior of the system (diffusion behavior, electrode kinetics, etc.) is required. This is due to the direct correlation between particle size and scattering intensity established through the SEM measurements. However, because the scattering analysis provides no information about the NPs' growth until it reaches a detectable size, fitting the data to a theoretical model has value because it can help infer information about the behavior before this point. To this end, a model is disclosed for fitting the single NP scattering data in terms of the local $Ag^+$ reduction potential and effective electrode area the NP occupies.

Figure 21:
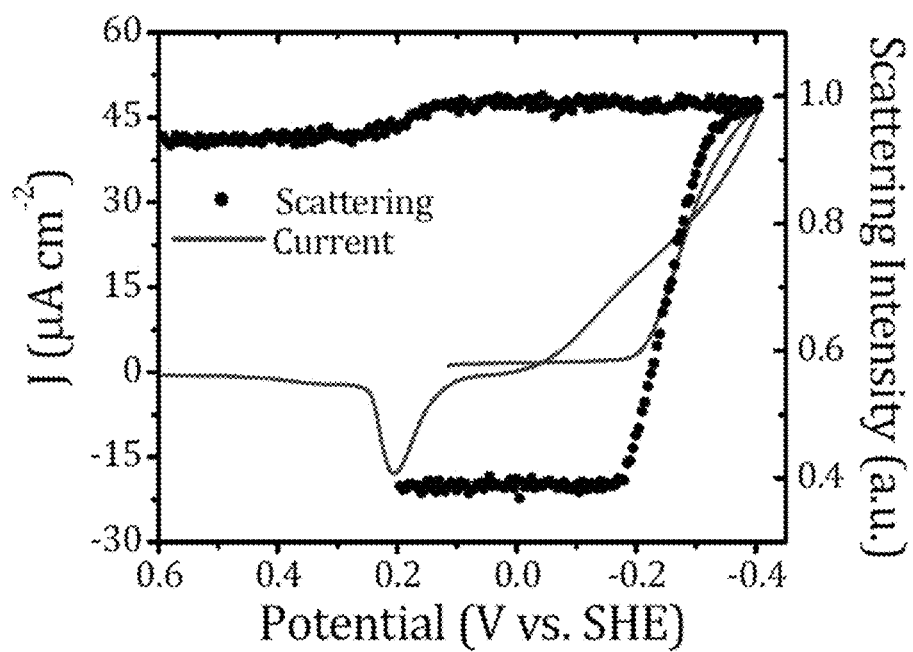
FIG. 21 shows the bulk current density and total scattering intensity at the ITO surface during potential cycling.
Figure 22:
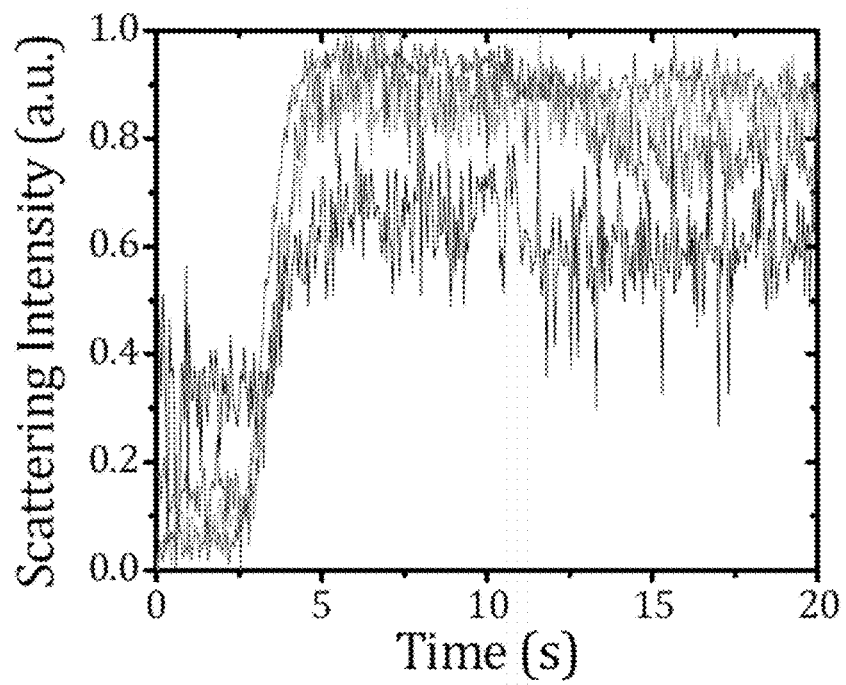
FIG. 22 shows the scattering transients for individual particles deposited and subsequently oxidized during potential cycling.

This technique has also been applied to observe the subsequent oxidation of the electrodeposited Ag particles. The results are given in FIG. 21 and FIG. 22. Oxidation of the Ag NPs is visible in the cyclic voltammogram at ~0.2 V vs. SHE. This correlates with a drop in total scattering intensity for the ensemble of deposited particles of about 10%. The relative reduction in scattering intensity for single particles upon oxidation varies from particle to particle, not being visible at all in some cases (e.g., FIG. 22).

Example 2

A MATLAB program was developed to help analyze single silver nanoparticle spectroscopic data obtained with a standard inverted optical microscope. The described software has provisions to mitigate the effects of high background signals present in such data sets and greatly streamlines their analysis. Efficient single nanoparticle image analysis is provided with these programs to support single nanoparticle imaging in an inverted configuration.

Dark field scattering was collected through an ×40 objective using a CCD camera (Andor iXon). Light scattering movies were recorded as a function of working electrode potential, as described earlier, at 50 ms resolution and saved as a Tagged Image File Format (TIFF) image stack.

Figure 23:
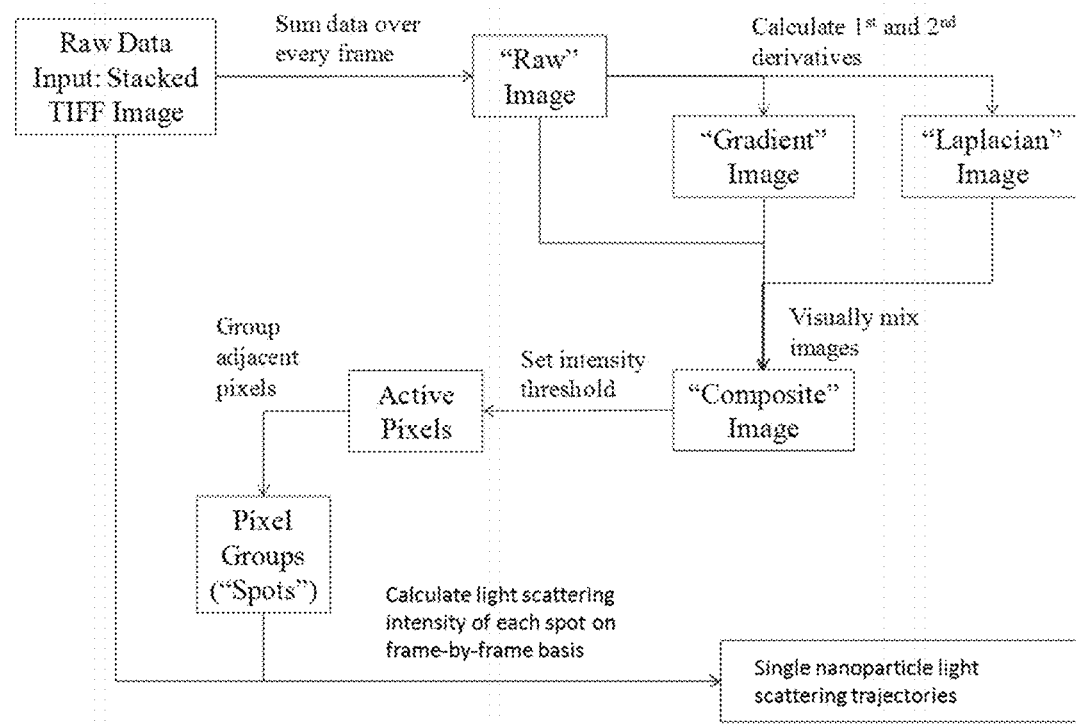
FIG. 23 is a flowchart depicting program flow.

Single molecule video files were analyzed using a MATLAB program that follows the process outlined in FIG. 23. Typically, the data was input as TIFF image stack.

Figure 24:
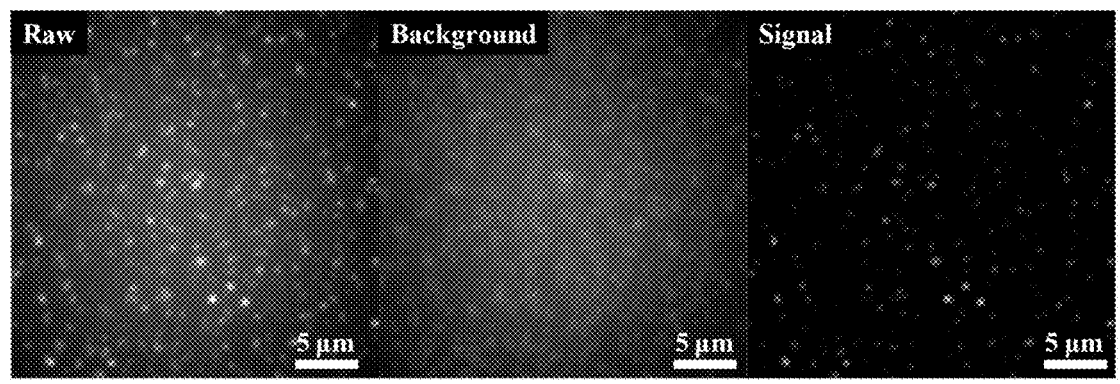
FIG. 24 contains fluorescence images displaying the effects of background removal.

Every frame of the image stack was first summed to create a "raw" image. This can be seen in FIG. 24. Due to the relatively low signal-to-noise ratio for these measurements, a large, inhomogeneous background signal was often present. This made locating active sites within the image by setting a simple intensity threshold difficult. To combat this, the discrete gradient norm ($G_{ij}$) and Laplacian ($L_{ij}$) for the image were then computed from the RAW image as:

$$G_{ij} = \sqrt{[(f_{i+1,j} - f_{ij}) + (f_{ij} - f_{i-1,j})]^2 + [(f_{i,j+1} - f_{ij}) + (f_{ij} - f_{i,j-1})]^2} \quad (7)$$

$$L_{ij} = \frac{1}{4}(f_{i+1,j} + f_{i-1,j} + f_{i,j+1} + f_{i,j-1}) - f_{ij}$$

The Raw, Gradient, and Laplacian images were visually mixed to generate a composite image which best resolves individual molecules/particles and effectively "flattens" the background. Upon setting an appropriate intensity threshold, the active pixels adjacent to one another were grouped together into "spots", each representing a single nanoparticle. Dark field scattering trajectories for single nanoparticles were then extracted by adding the intensities for each pixel in a given spot and subtracting a background value on a frame-by-frame basis.

For a given spot, the bordering pixels' intensities were averaged together to generate a suitable background value and subtracted according to:

$$S = \sum f_a - \frac{N_a}{N_b} \sum f_b \quad (8)$$

where S is the intensity corresponding to a single molecule/particle, $f_a$ are the intensities for the active pixels, and $f_b$ are the intensities for the background pixels. The effects of the background separation can be seen in FIG. 24.

Example 3

Figure 25:
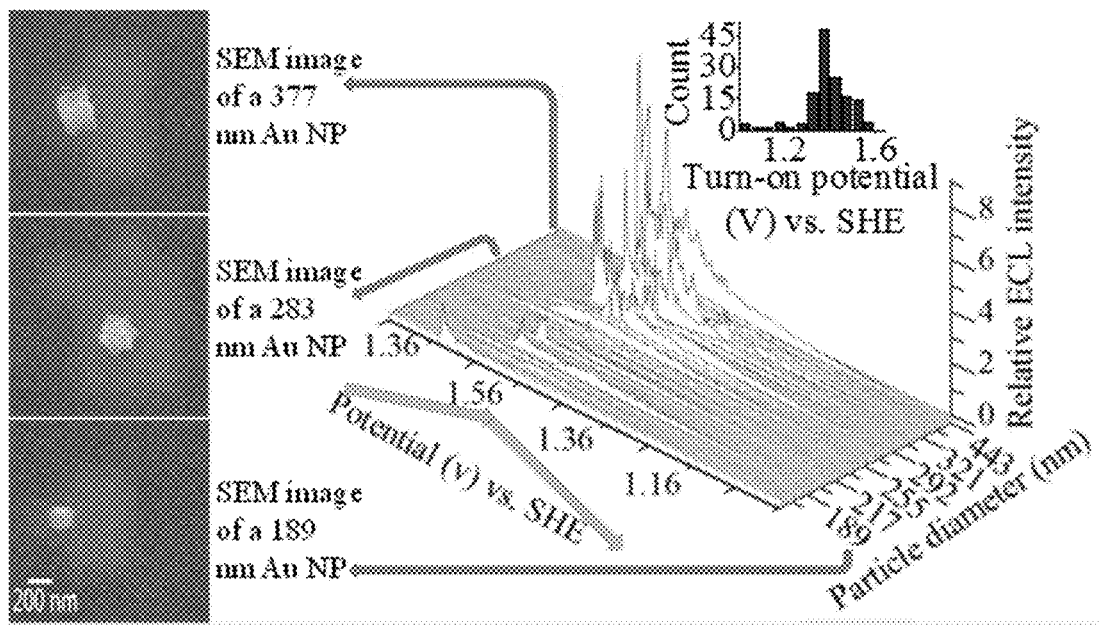
FIG. 25 contains electrogenerated chemiluminescence (ECL) images of single Au nanoparticles.

The methods and systems described herein can also be used for imaging electrodeposited Au nanoparticles (NPs) using electrogenerated chemiluminescence (ECL). For example, ECL catalyzed by Au NPs with diameters from a few nanometers to a few hundred nanometers was investigated as shown in FIG. 25. Au NPs can catalyze the oxidation of tripropylamine (TrPA) when deposited onto an indium tin oxide (ITO) surface, which exhibits sluggish kinetics for this reaction. This large difference in kinetic facility enabled the detection of ECL of Ru(bpy)$_3^{2+}$ at single Au NPs in aqueous solution. The ECL at individual Au NPs can be correlated to their size to directly resolve heterogeneities in local charge transfer events. Using this technique, intermittent ECL ("blinking") at single Au NPs was observed and can be attributed to surface oxidation and regeneration of small Au clusters during the ECL generation process. Quantitative relationships between Au NP size and local ECL intensity have been obtained and compared to theoretical predictions.

Example 4

Figure 26:
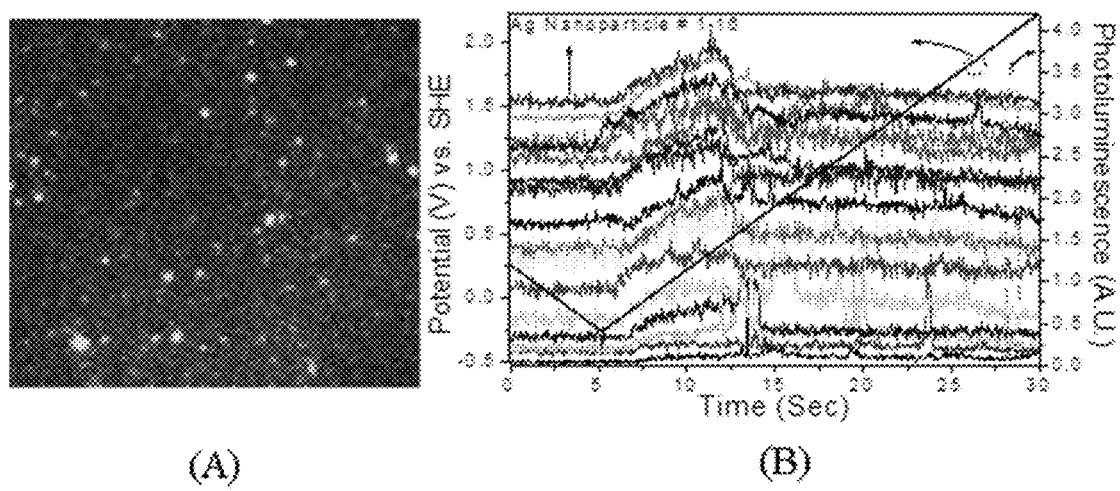
FIG. 26 displays (A) individual luminescent, plasmonic silver nanoparticles that were investigated using fluorescence spectroelectrochemistry (B).

The methods and systems described herein can be used to track the redox properties of metallic nanoparticles using fluorescence microscopy. For example, the spectroelectrochemical properties of individual luminescent, plasmonic silver nanoparticles (FIG. 26A) were investigated using fluorescence spectroelectrochemistry (FIG. 26B). Fluorescence intensities from individual nanoparticles were measured while the substrate's electrochemical potential was controlled to produce and oxidize the Ag nanoparticles. The spectroelectrochemical responses of individual nanoparticles were used to study heterogeneities in their redox properties not visible in bulk voltammetric measurements. The Ag nanoparticles exhibited a range of redox potentials and their statistical distribution was dependent on the electrolyte system used. No variations in the spectral profile of bulk nanoparticle samples were observed, implying no correlation between the redox potentials of individual nanoparticles and the energy of emitted photons from fluorescent sites on Ag nanoparticles. This can be due to a negligible difference in the redox potentials for individual emissive sites on a given Ag nanoparticle and/or the shrinking of the polarizable bulk of the Ag nanoparticles.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible examples may be made of the invention without departing from the scope thereof, it is to be understood that all matter herein set forth or shown in the accompanying drawings is to be interpreted as illustrative and not in a limiting sense.

What is claimed is:
1. A method, comprising:
applying a potential to a liquid sample within an electrochemical cell;
wherein the liquid sample comprises metal ions and at least a portion of the metal ions form nanoparticles, clusters of nanoparticles, or a combination thereof upon the application of a sufficient potential to the liquid sample;
wherein the electrochemical cell resides within a system having an optical path, and the electrochemical cell comprises:
a working electrode in electrochemical contact with the liquid sample wherein the working electrode comprises a microscope coverslip that is substantially optically transparent;
a sample containment vessel comprising a top end, a bottom end, an exterior surface, and an interior void defined by an interior surface;
wherein the bottom end forms a liquid tight seal with the working electrode;
wherein the liquid sample is contained in the volume defined by the interior void of the sample containment vessel and the working electrode, such that the liquid sample resides within the optical path of the system;
wherein the volume defined by the interior void of the sample containment vessel is 1 milliliter (mL) or less;
wherein the sample containment vessel is substantially nonconducting;
one or more additional electrodes in electrochemical contact with the liquid sample; and
a power supply electrically coupled to the working electrode and the one or more additional electrodes, wherein the power supply is configured to apply the potential to the liquid sample;
capturing an electrochemical signal from the liquid sample;
capturing an image from the liquid sample, wherein the image comprises a dark field scattering image, an electrogenerated chemiluminescence image, a fluorescence image, or a combination thereof;
processing the electrochemical signal to obtain an electrochemical parameter;
processing the image to obtain an optical parameter, wherein the optical parameter comprises nanoparticle size; and
correlating the optical parameter to the electrochemical parameter to obtain an optoelectrochemical parameter, wherein the optoelectrochemical parameter comprises the potential and current at which individual nanoparticles, clusters of nanoparticles, or a combination thereof, of a specific size are formed in the liquid sample.

2. The method of claim 1, wherein the system comprises:
a light source configured to illuminate the liquid sample;
a first lens configured to focus the light source onto the microscope coverslip; and
a camera configured to capture the image from the liquid sample;
wherein the optical path of the system is from the light source to the camera through the first lens and the liquid sample.

3. The method of claim 2, where in the first lens is a microscope objective.

4. The method of claim 2, further comprising a second lens wherein the system is aligned such that the optical path traverses from the light source to the camera through the first lens, the second lens, and the liquid sample.

5. The method of claim 4, wherein the first lens is a dark field microscope objective and the second lens is a dark field microscope condenser.

6. The method of claim 1, wherein the working electrode comprises an indium tin oxide (ITO) coated coverslip.

7. The method of claim 1, wherein the sample containment vessel further comprises a channel that punctuates the interior surface of the sample containment vessel and leads through the sample containment vessel to the top end or exterior surface of the sample containment vessel,
wherein the channel is configured to receive the one or more additional electrodes such that the one or more additional electrodes are in electrochemical contact with the liquid sample; and
wherein the one or more additional electrodes form a liquid tight seal with the channel.

8. The method of claim 1, wherein the metal ions comprise gold ions, silver ions, or a combination thereof.

\* \* \* \* \*